United States Patent
Eletrabi et al.

(10) Patent No.: US 12,544,629 B2
(45) Date of Patent: Feb. 10, 2026

(54) AUTONOMOUS TENNIS BALL RETRIEVAL ROBOTS

(71) Applicant: Tennibot Inc., Auburn, AL (US)

(72) Inventors: Haitham Ahmed Reda Eletrabi, Auburn, AL (US); Xianglin Wang, Auburn, AL (US)

(73) Assignee: Tennibot Inc., Auburn, AL (US)

( * ) Notice: Subject to any disclaimer, the term of this patent is extended or adjusted under 35 U.S.C. 154(b) by 927 days.

(21) Appl. No.: 17/827,907

(22) Filed: May 30, 2022

(65) Prior Publication Data

US 2023/0381598 A1    Nov. 30, 2023

(51) Int. Cl.
*A63B 47/02*   (2006.01)
*A63B 69/38*   (2006.01)
*A63B 69/40*   (2006.01)

(52) U.S. Cl.
CPC ............ *A63B 47/021* (2013.01); *A63B 69/38* (2013.01); *A63B 69/40* (2013.01); *A63B 2047/022* (2013.01); *A63B 2220/833* (2013.01)

(58) Field of Classification Search
CPC ....... A63B 47/021; A63B 69/38; A63B 69/40; A63B 2220/833; A63B 2047/022
USPC ....................................................... 294/19.2
See application file for complete search history.

(56) References Cited

U.S. PATENT DOCUMENTS

| | | | | |
|---|---|---|---|---|
| 5,147,100 A * | 9/1992 | Frankel | ................ | A63B 47/021 414/440 |
| 8,075,030 B2 * | 12/2011 | Pearson | ................ | A63B 47/02 294/19.2 |
| 8,602,711 B1 * | 12/2013 | Nash | .................... | A63B 47/021 294/19.2 |
| 10,232,229 B2 * | 3/2019 | Jennings | ............... | A63B 47/024 |
| 11,511,165 B1 * | 11/2022 | Eletrabi | ................. | G05D 1/249 |
| 2006/0082171 A1 * | 4/2006 | Olmstead | ............. | A63B 47/021 294/19.2 |
| 2017/0189769 A1 * | 7/2017 | Chen | .................... | A63B 47/021 |
| 2023/0381585 A1 * | 11/2023 | Wang | ................... | G06V 40/103 |
| 2023/0381599 A1 * | 11/2023 | Eletrabi | ............... | G05D 1/0274 |
| 2024/0218863 A1 * | 7/2024 | Eletrabi | .................. | F04B 53/16 |

* cited by examiner

*Primary Examiner* — Paul T Chin
(74) *Attorney, Agent, or Firm* — EVERSHEDS SUTHERLAND (US) LLP

(57) ABSTRACT

Systems, methods, and computer-readable media are disclosed for autonomous tennis ball retrieval robots. Example robots include a housing comprising a ball inlet, a first wheel coupled to the housing, a ball collection portion coupled to the housing and configured to receive a plurality of balls, a first arm and a second arm removably coupled to the housing, where the first arm and the second arm together guide balls towards the ball inlet, a ball direction device configured to direct balls from the ball inlet to the ball collection portion, and a first sensor coupled to the first arm, where the autonomous tennis ball retrieval robot is configured to detect obstacles using the first sensor. The autonomous tennis ball retrieval robot may be configured to retrieve balls disposed in an ambient environment, and may be configured to be transported in a rolling mode using the first wheel.

20 Claims, 16 Drawing Sheets

AUTONOMOUS TENNIS BALL RETRIEVAL ROBOTS

BACKGROUND

Certain sports may be played with multiple people, such as tennis, volleyball, badminton, and so forth. However, players may desire to practice such sports alone. For example, a tennis player may desire to practice various tennis movements, but may not have an opponent. In addition, a player may use multiple tennis balls during a practice session and/or during a match. Retrieval of tennis balls, or other sports equipment for different sports, may be cumbersome and time consuming. Accordingly, autonomous tennis assistant devices may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

During gameplay of certain games, such as tennis, badminton, pickle ball, and so forth, players may use a ball or other object. In some instances, more than one ball or object may be used. For example, during tennis, multiple tennis balls may be used during gameplay. Retrieval of tennis balls or other gameplay objects may be time consuming and cumbersome. In addition, players may desire to practice on their own, without another human player.

Embodiments of the disclosure include autonomous tennis assistant systems that may include autonomous tennis ball retrieval robots and base stations that can be used to not only retrieve tennis balls autonomously, but also to capture various player performance metrics during gameplay or practice sessions.

Figure 1:
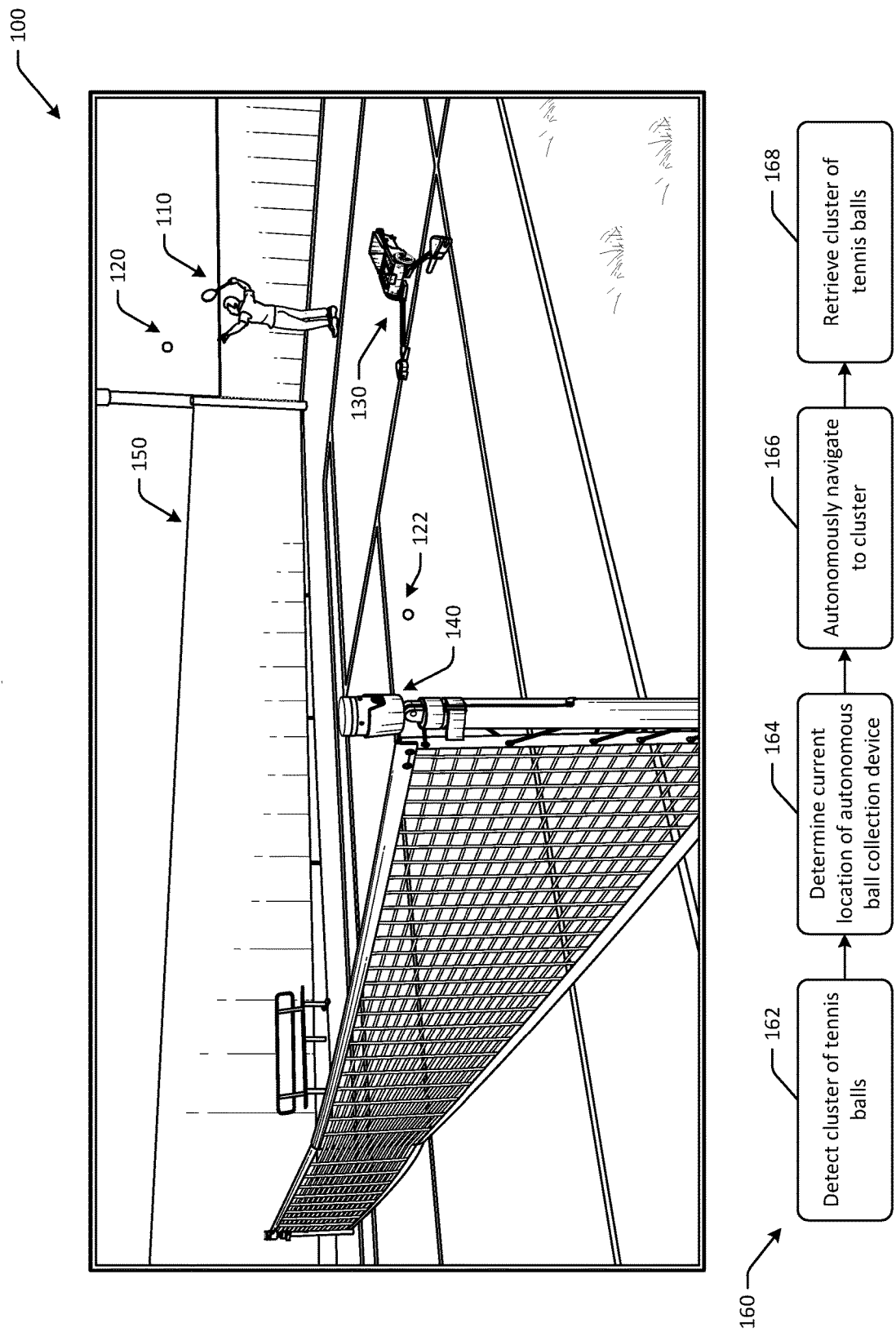
FIG. 1 is a schematic illustration of an example use case for an autonomous tennis assistant device in accordance with one or more example embodiments of the disclosure.

Referring to FIG. 1, an example use case 100 for an autonomous tennis assistant system is depicted in accordance with one or more example embodiments of the disclosure. For example, a player 110 may be playing or practicing tennis on a tennis court using a first tennis ball 120 and a second tennis ball 122. Any number of balls may be used. The autonomous tennis assistant system may include a tennis ball retrieval robot 130 and a base station 140 in wireless communication with each other. The autonomous tennis assistant system may determine locations of the tennis balls on or around the tennis court, and may cause the tennis balls to be retrieved using the tennis ball retrieval robot 130. For example, images of the tennis court and surrounding area captured by cameras disposed at the base station 140 and/or the tennis ball retrieval robot 130 may be processed using computer vision algorithms to detect boundaries of the court, including edge boundaries 150, such as fences or other obstacles, as well as tennis balls, such as the first tennis ball 120 and the second tennis ball 122. The tennis ball retrieval robot 130 and/or the base station 140 may generate a path to the location of the tennis balls and autonomously retrieve the tennis balls. In some embodiments, the tennis ball retrieval robot 130 may be configured to eject the tennis balls back towards the player 110 for practice play.

To autonomously retrieve tennis balls, an example process flow 160 is presented and may be performed, for example, by one or more remote servers, the base station 140, and/or the tennis ball retrieval robot 130. The remote server and/or computer system may include at least one memory that stores computer-executable instructions and at least one processor configured to access the at least one memory and execute the computer-executable instructions to perform various actions or operations, such as one or more of the operations in the process flow 160 of FIG. 1.

At a first block 162, a cluster of tennis balls may be detected. A cluster may be a predetermined density or number of tennis balls within a certain area. Other metrics may be used to determine and/or identify clusters, as discussed at least with respect to FIGS. 2 and 7. At a second block 164, a current location of an autonomous ball collection device, such as the tennis ball retrieval robot 130, may be determined. For example, a location of the tennis ball retrieval robot 130 relative to the cluster of tennis balls may be determined. At a third block 166, the tennis ball retrieval robot 130 may autonomously navigate to the cluster. For example, a path may be planned to navigate through the ambient environment to the cluster, where obstacles can be detected in real-time and avoided. At a fourth block 168, the cluster of tennis balls may be retrieved by the tennis ball retrieval robot 130. The retrieval process may include guiding the tennis balls towards a ball inlet on the tennis ball retrieval robot 130 using two arms, where the balls are propelled along a ball direction path into a ball collection device on the tennis ball retrieval robot 130.

Example embodiments of the disclosure provide a number of technical features or technical effects. For example, in accordance with example embodiments of the disclosure, certain embodiments of the disclosure may automatically determine paths through ambient environments and/or autonomously retrieve tennis balls. As a result of improved functionality, embodiments may detect and retrieve tennis balls in an efficient manner. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
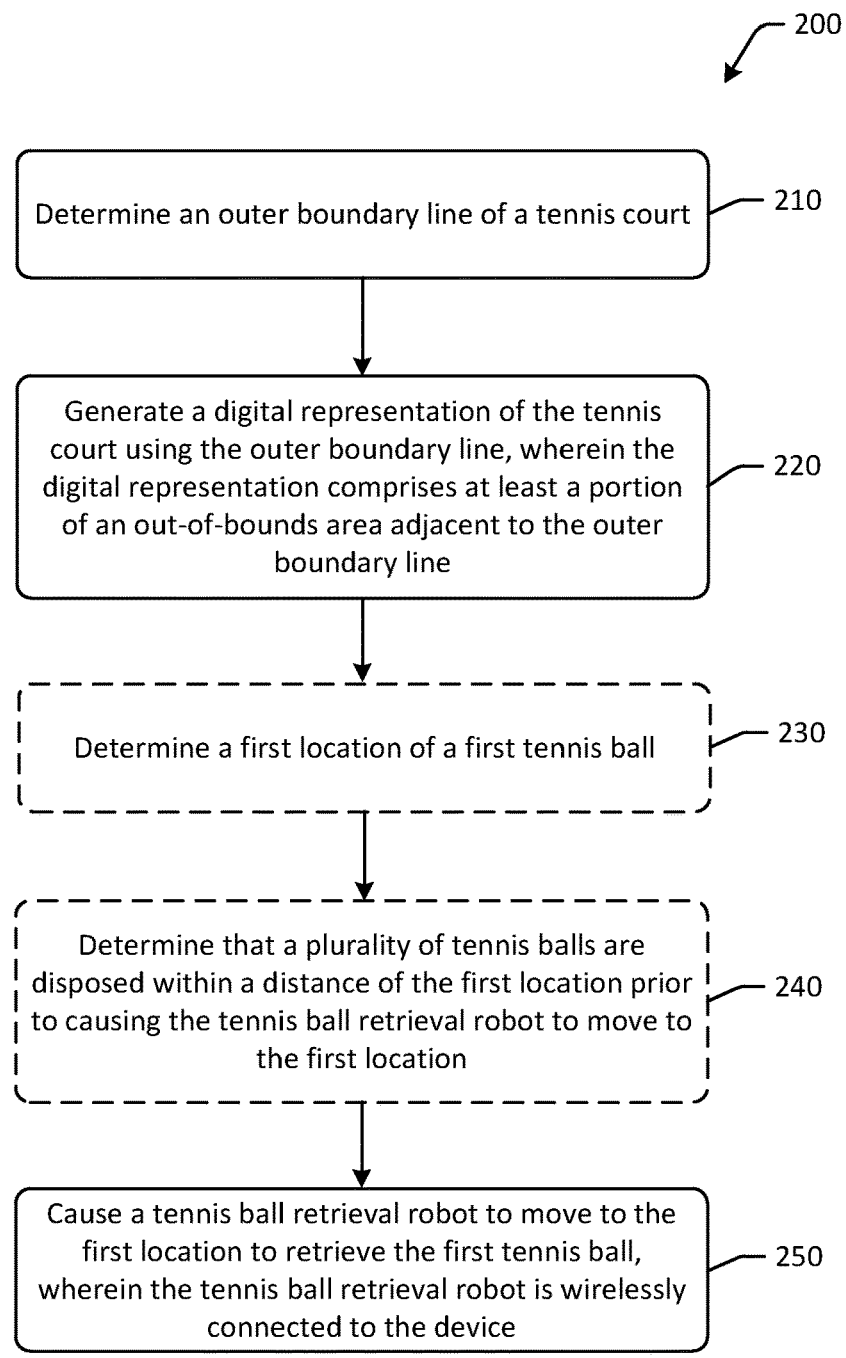
FIG. 2 is a schematic illustration of an example process flow for autonomous tennis ball retrieval in accordance with one or more example embodiments of the disclosure.

FIG. 2 depicts an example process flow 200 for autonomous tennis ball retrieval in accordance with one or more example embodiments of the disclosure. While example embodiments of the disclosure may be described in the context of tennis balls, it should be appreciated that the disclosure is more broadly applicable to any type of object retrieval. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine an outer boundary line of a tennis court. For example, a base station or a remote server may determine an outer boundary line of a tennis court. The outer boundary line may be determined using computer vision processing of one or more images or videos captured using a camera at a base station or a tennis ball retrieval robot. The images may be processed for edge detection to identify a location of outer boundary lines. Additional features or landmarks, such as inside boundary lines, edge boundaries of a tennis court, such as a fence, a net post, or other edge boundary, nets, and/or other features may be detected in addition to the outer boundary line. Analysis of frames may include processing images using one or more object recognition algorithms, determining pixel color values, comparing certain portions of frames to previous or subsequent frames in a video, and the like.

At block 220 of the process flow 200, computer-executable instructions stored on a memory of a device may be executed to generate a digital representation of the tennis court using the outer boundary line, wherein the digital representation comprises at least a portion of an out-of-bounds area adjacent to the outer boundary line. For example, a remote server and/or the base station may generate a digital representation of the tennis court using the outer boundary line, wherein the digital representation comprises at least a portion of an out-of-bounds area adjacent to the outer boundary line. The digital representation may be presented at a user interface, such as that described with respect to FIG. 7. The digital representation may include a virtual rendering of the tennis court, including the tennis ball retrieval robot and the base station in their respective locations. The digital representation may include edge boundaries, as well as optional locations of tennis balls and/or clusters of tennis balls. The out-of-bounds area may include area between the tennis court boundary line and an edge boundary, where tennis balls may accumulate in the out-of-bounds area.

At optional block 230 of the process flow 200, computer-executable instructions stored on a memory of a device may be executed to determine a first location of a first tennis ball. For example, a remote server, a tennis ball retrieval robot, and/or a base station may determine a first location of a first tennis ball. The first location may be determined based at least in part on analysis of images captured by the base station and/or the tennis ball retrieval robot. For example, various computer vision processing of images may be performed, such as object detection algorithm processing, to detect tennis balls in a frame. The location of the tennis balls may be determined as absolute positioning or as relative positioning, such as relative to the location of the tennis ball retrieval robot.

At optional block 240, computer-executable instructions stored on a memory of a device may be executed to determine that a plurality of tennis balls are disposed within a distance of the first location prior to causing the tennis ball retrieval robot to move to the first location. For example, a remote server, a tennis ball retrieval robot, and/or a base station may determine that a plurality of tennis balls are disposed within a distance of the first location prior to causing the tennis ball retrieval robot to move to the first location. Such an arrangement of tennis balls may be identified as a cluster. Retrieval of a cluster of tennis balls may be prioritized over individual tennis balls, as more tennis balls may be retrieved from a cluster than individual tennis balls. Accordingly, in some embodiments, clusters may be located prior to causing a tennis ball retrieval robot to move.

At block 250, computer-executable instructions stored on a memory of a device may be executed to cause a tennis ball retrieval robot to move to the first location to retrieve the first tennis ball, wherein the tennis ball retrieval robot is wirelessly connected to the device. For example, a remote server, a tennis ball retrieval robot, and/or a base station may cause a tennis ball retrieval robot to move to the first location to retrieve the first tennis ball, wherein the tennis ball retrieval robot is wirelessly connected to the device. The first tennis ball may be near or part of a cluster of tennis balls, and the tennis ball retrieval robot may autonomously navigate to the first location to retrieve the first tennis ball. After the first tennis ball is retrieved, the tennis ball retrieval robot may continue to retrieve other tennis balls in the cluster and/or on the tennis court.

Figure 3:
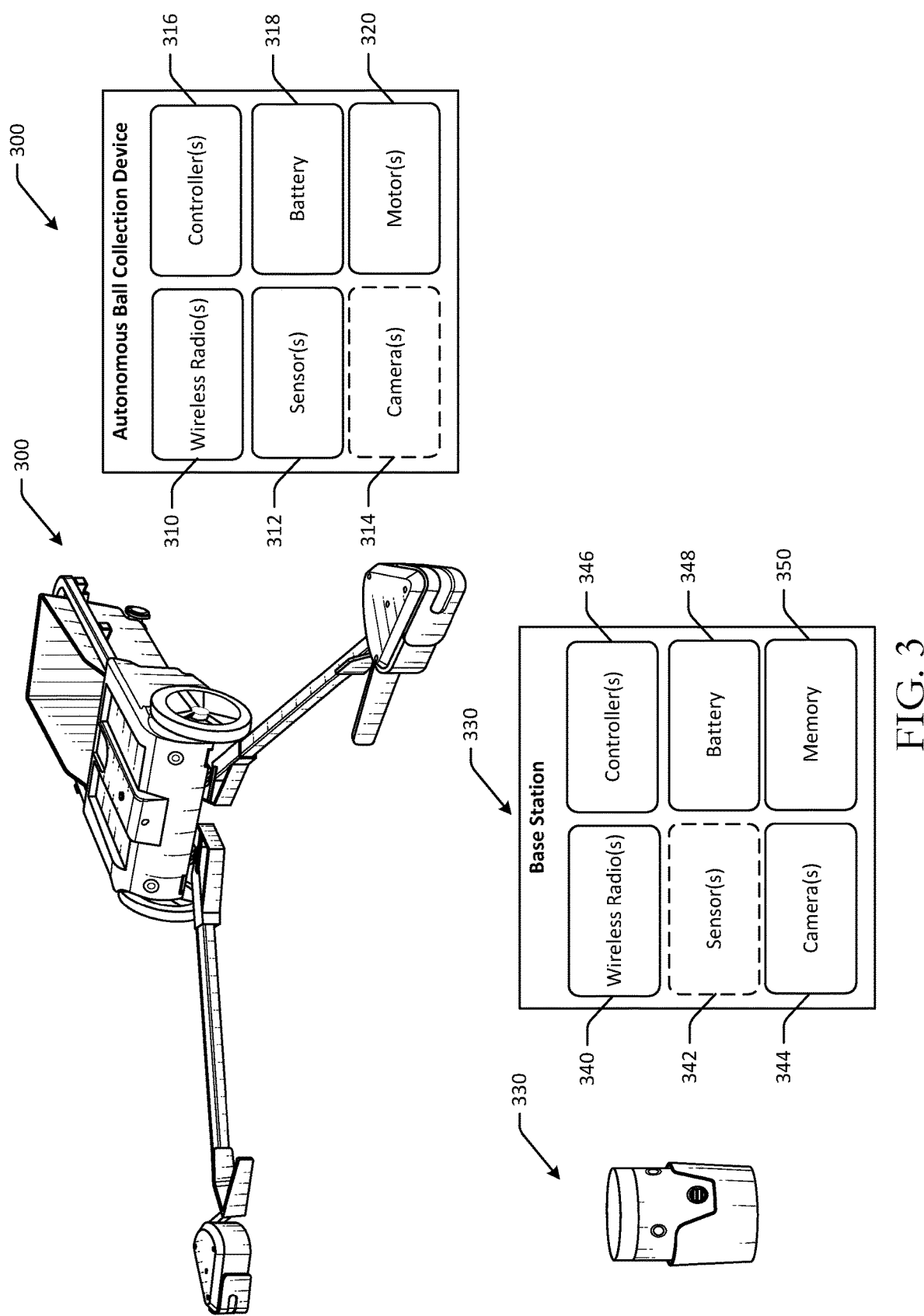
FIG. 3 schematically illustrates components of an autonomous tennis assistant system, including an autonomous tennis ball retrieval robot and a base station, in accordance with one or more example embodiments of the disclosure.

FIG. 3 schematically illustrates components of an autonomous tennis assistant system, including an autonomous tennis ball retrieval robot 300 and a base station 330, in accordance with one or more example embodiments of the disclosure. Different embodiments may include different, additional, or fewer components than those illustrated in the examples of FIG. 3. The tennis ball retrieval robot 300 and base station 330 may be the same tennis ball retrieval robot discussed with respect to the other figures.

A tennis ball retrieval robot 300 may be configured to retrieve one or more tennis balls autonomously, where the tennis ball retrieval robot 300 may detect tennis balls in an ambient environment and navigate to the detected balls for retrieval. The tennis ball retrieval robot 300 may operate in conjunction with a base station 330, where the base station 330 may provide data from a different vantage point, such as elevated with respect to the tennis ball retrieval robot 300, where the data can be used to retrieve tennis balls, identify boundaries, identify obstacles, and/or other functionality.

In one example embodiment, the tennis ball retrieval robot 300 may be an autonomous ball collection device that includes one or more wireless radios 310, one or more sensors 312, one or more optional cameras 314, one or more controllers 316, one or more batteries 318, one or more motors 320, and/or other components. The wireless radio 310 may be used to communicate wirelessly with other components, such as the base station 330, a user device, a remote server, and so forth. In some embodiments, the wireless radio 310 may be configured to broadcast a wireless network or hotspot in conjunction with an antenna. The sensors 312 may include any suitable sensor used for navigation, such as ultrasonic sensors, proximity sensors, depth sensors, and so forth. The optional cameras 314 may include one or more cameras oriented to image a field of view in front of the tennis ball retrieval robot 300, where the images or videos may be used to detect the presence of tennis balls. Other cameras may be used and may have different placement or positioning. The controller 316 may include one or more computer processors coupled to memory and may be configured to control various operations of the tennis ball retrieval robot 300. The batteries 318 may be configured to power the motor of the tennis ball retrieval robot 300, as well as various electronics. The batteries 318 may therefore be rechargeable. The motors 320 may power wheels to move the tennis ball retrieval robot 300. Any number of motors may be included.

The base station 330 may be configured to communicate wirelessly with the tennis ball retrieval robot 300 and/or one or more remote servers. The base station 330 may operate in conjunction with the tennis ball retrieval robot 300 to detect tennis ball location and retrieve tennis balls. In some embodiments, the base station 330 may determine various performance metrics for users via images captured during gameplay. In addition, the base station 330 may determine whether a tennis ball landed inside or on a boundary line, outside a boundary line, whether a point was scored, a ball speed of a tennis ball, topspin of a tennis ball, a type of stroke used to hit a tennis ball, whether a tennis match was won, and/or other metrics based at least in part on video captured by one or more cameras of the base station 330.

In one example embodiment, the base station 330 may be include one or more wireless radios 340, one or more optional sensors 342, one or more cameras 344, one or more controllers 346, one or more batteries 348, memory 350, and/or other components. The wireless radio 340 may be used to communicate wirelessly with other components, such as the tennis ball retrieval robot 300, a user device, a remote server, and so forth. In some embodiments, the wireless radio 340 may be configured to broadcast a wireless network or hotspot in conjunction with an antenna. The optional sensors 342 may include any suitable sensor, such as ultrasonic sensors, proximity sensors, depth sensors, and so forth. The cameras 344 may include one or more cameras oriented to image a field of view in front of the base station 330. Some embodiments may include one camera oriented towards a first side of a tennis court, and a second camera oriented towards a second side of the tennis court. Other cameras may be used and may have different placement or positioning. The controller 346 may include one or more computer processors coupled to memory and may be configured to control various operations of the base station 330. The batteries 348 may be configured to power the base station 330. The batteries 348 may therefore be rechargeable. The memory 350 may be configured to store video captured using the camera 344.

Figure 4A:
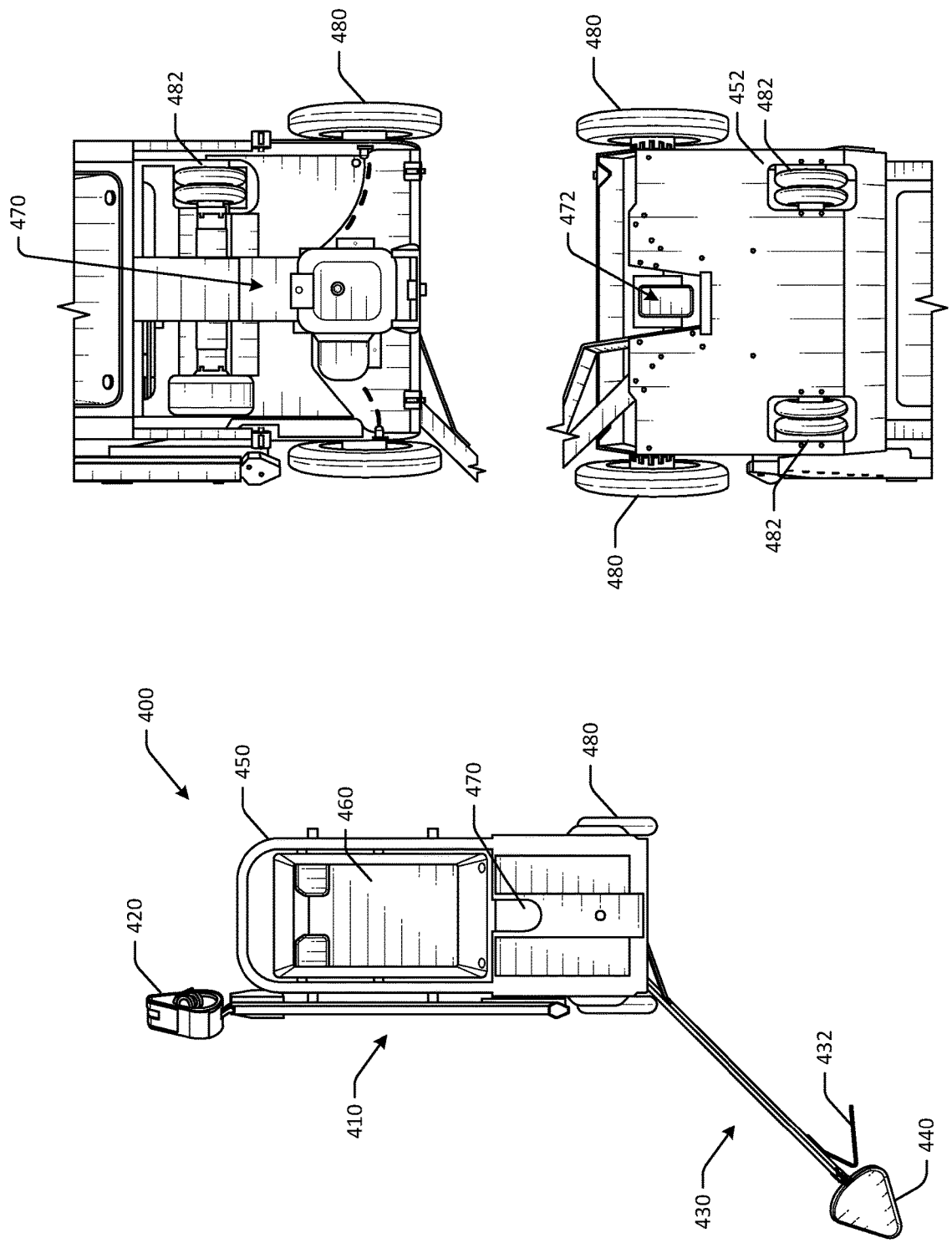
FIGS. 4A-4C are schematic illustrations of various views of an autonomous tennis ball retrieval robot in accordance with one or more example embodiments of the disclosure.
Figure 4B:
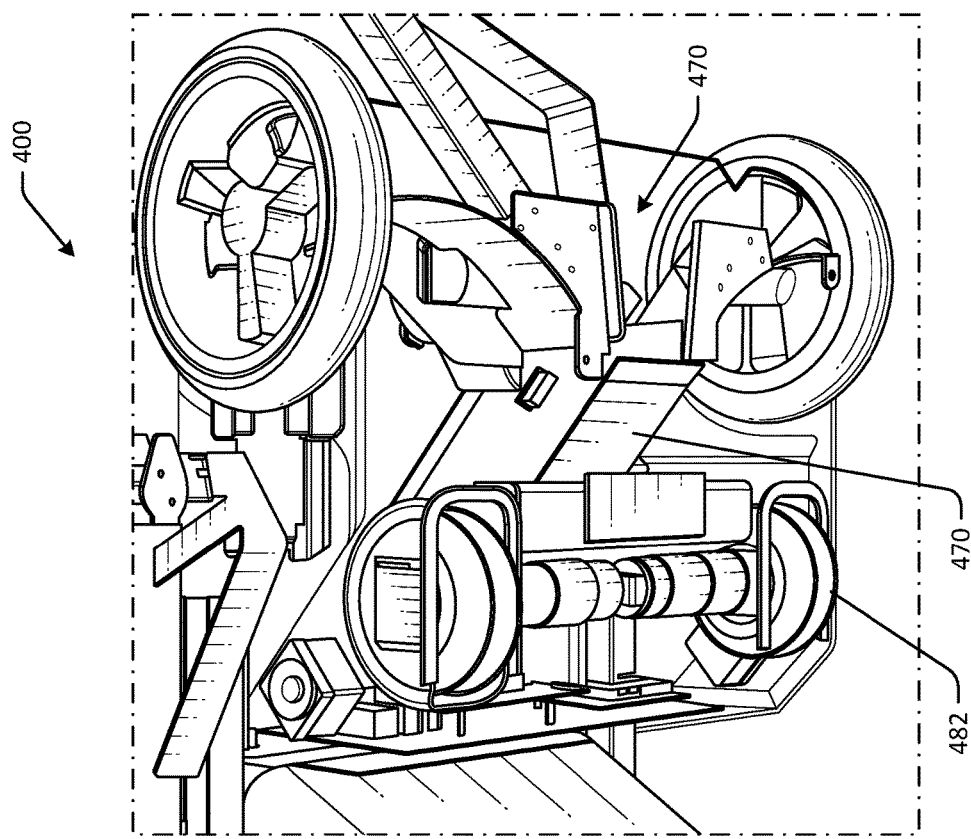
Figure 4B:
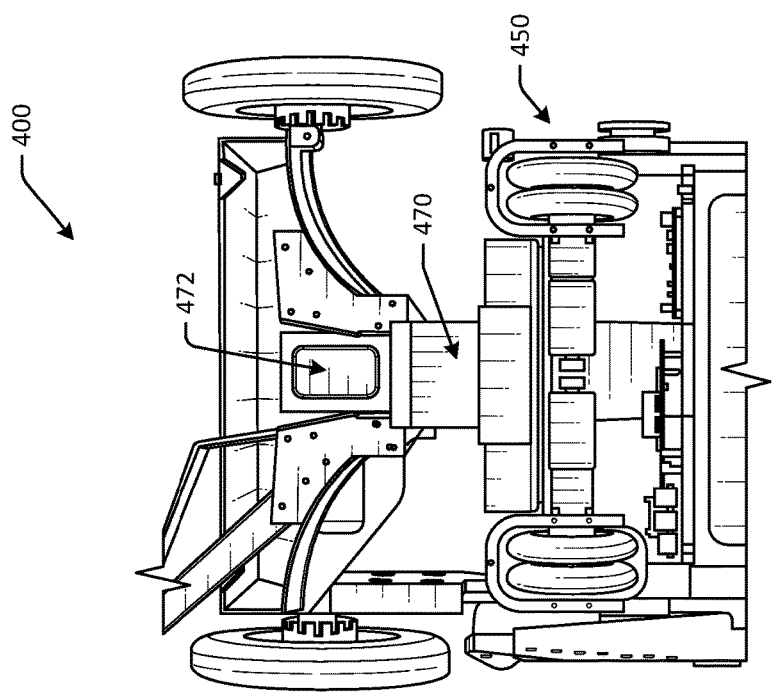
Figure 4C:
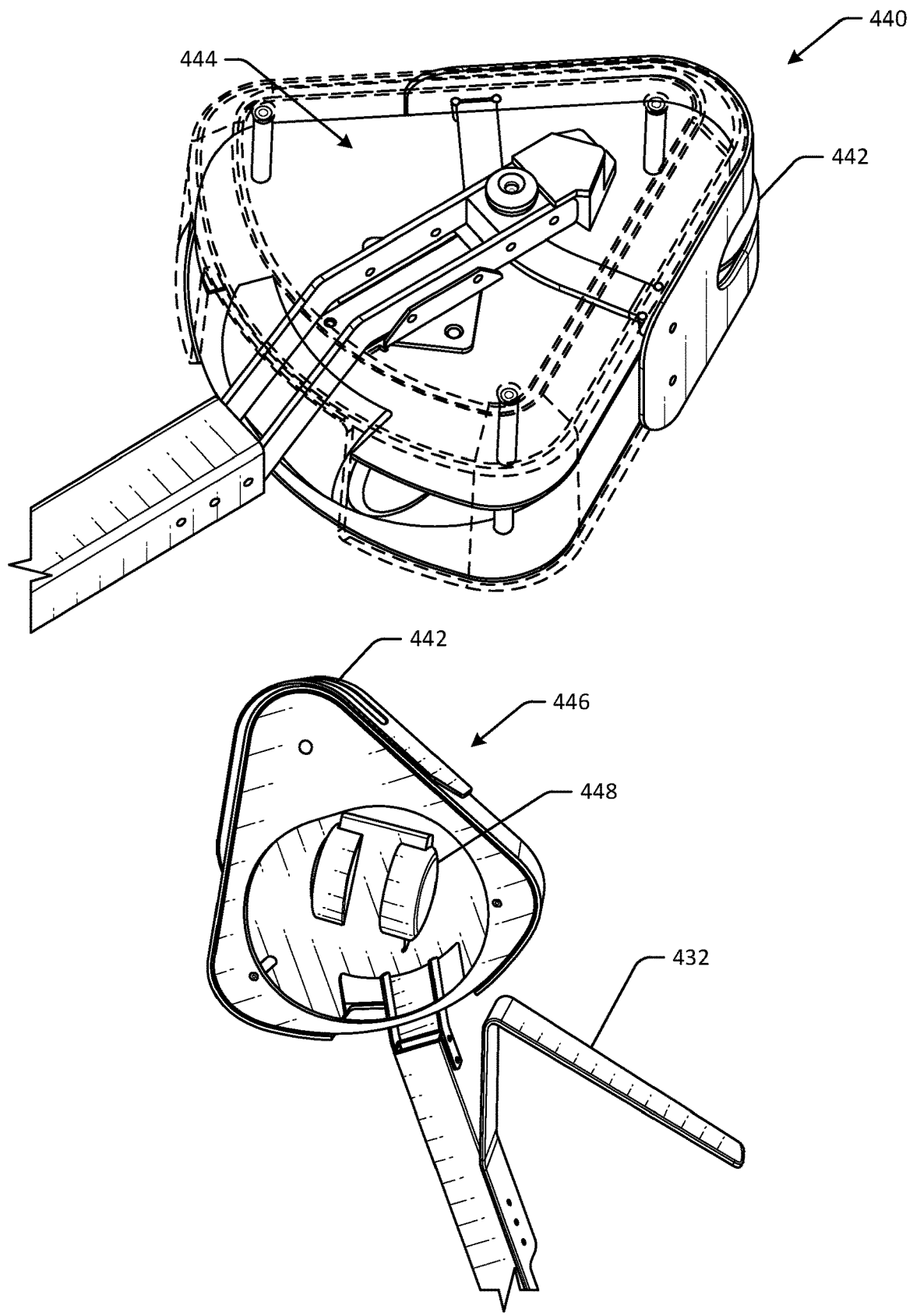

FIGS. 4A-4C are schematic illustrations of various views of an autonomous tennis ball retrieval robot 400 in accordance with one or more example embodiments of the disclosure. Other embodiments may include different and/or additional or fewer components than those illustrated in FIGS. 4A-4C. The tennis ball retrieval robot 400 may be the same tennis ball retrieval robot discussed with respect to FIGS. 1-3.

The tennis ball retrieval robot 400 may be configured to retrieve balls disposed in an ambient environment. The tennis ball retrieval robot 400 may be an autonomous interactive tennis ball device configured to retrieve tennis balls autonomously. In some embodiments, the tennis ball retrieval robot 400 may be further configured to eject tennis balls autonomously.

In FIG. 4A, the tennis ball retrieval robot 400 is depicted in a top view, as well as partial bottom views. In the top view, the tennis ball retrieval robot 400 is depicted with a first arm 420 in a stored position and a second arm 430 in an engaged position. To begin operation, the first arm 420 may be coupled to a housing 410 of the tennis ball retrieval robot 400. An angle between the first arm 420 and the second arm 430 may be fixed and in some instances may be adjustable (either manually or automatically). The second arm 430 may include a head 440 disposed at a distal end of the second arm 430. The first arm 420 may include the same elements as the second arm 430, such as the head. The head 440 may be an angular head, and in some instances may have a triangular geometrical configuration. Other embodiments may have a different geometrical configuration. The second arm 430 may include a bent member 432 configured to prevent tennis balls from rolling away from a front end of the tennis ball retrieval robot 400. The first arm 420 may also include the bent member. The second arm 430 and/or the first arm 420 may include any number of sensors disposed thereon or therein, such as inside the head 440.

Figure 8:
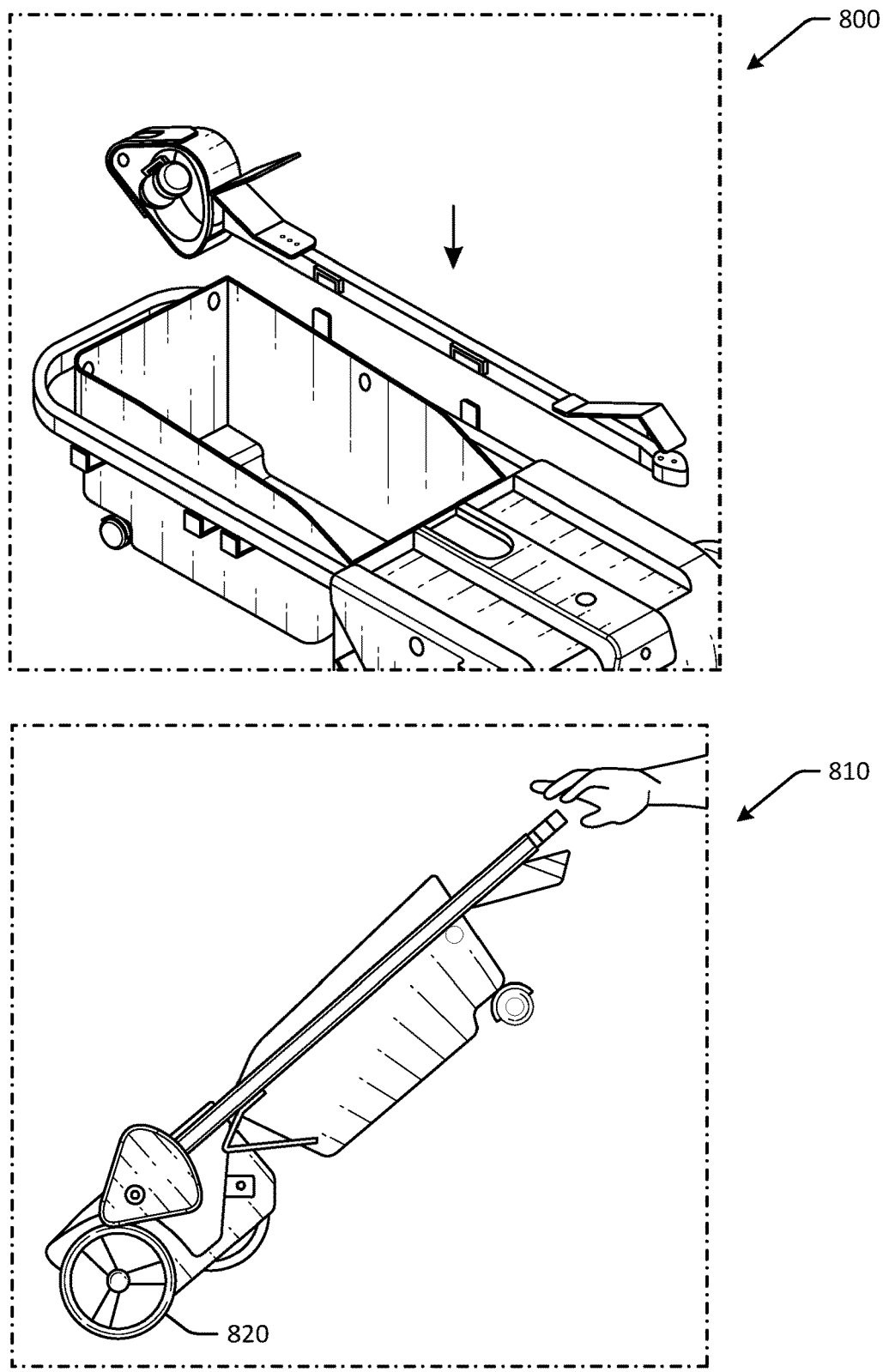
FIG. 8 is a schematic illustration of an autonomous tennis ball retrieval robot in a portable mode in accordance with one or more example embodiments of the disclosure.

The tennis ball retrieval robot 400 may include a frame 450 that can be used to manually handle the tennis ball retrieval robot 400, such as during transport or in a rolling mode, as discussed in more detail with respect to FIG. 8. The tennis ball retrieval robot 400 may include a ball collection device 460 that may be configured to rotate with respect to the frame 450, such as into and/or out of the page in the example of FIG. 4A. The tennis ball retrieval robot 400 may include a ball direction path 470 that guides balls from a ball inlet at a front end of the housing 410 (where the ball inlet is formed in the housing between the first arm 420 and the second arm 430) to the ball collection device 460. The tennis ball retrieval robot 400 may include one or more wheels 480. For example, the wheels 480 may be used to allow the tennis ball retrieval robot 400 to roll in a rolling mode (e.g., when the first arm 420 and the second arm 430 are removed from the housing 410). The wheels 480 may be coupled to a motor and actively driven in some embodiments.

The tennis ball retrieval robot 400 is depicted in bottom view with and without a shield 452. As depicted in the bottom views, the tennis ball retrieval robot 400 may include one or more additional guide wheels 482 to assist in movement of the tennis ball retrieval robot 400. The guide wheels 482 may be driven or passive. The tennis ball retrieval robot 400 may include a ball roller 472 configured to propel tennis balls along the ball direction path 470 from the ball inlet to the ball collection device 470. The ball roller 472 may be a wheel, a sphere, a cylinder, or another type of driven roller configured to rotate and propel balls in a certain direction. The ball roller 472 may have a high friction coating disposed thereon to increase traction on tennis ball surfaces. The ball roller 472 and corresponding ball direction path are depicted in detail in the bottom view and bottom perspective view of FIG. 4B.

The head 440 of the arms is depicted in perspective and bottom perspective views in FIG. 4C. The head 440 may include one or more active or passive roller wheels 442 that allow for the head 440 to move along edge boundaries, such as a fence. The head 440 may include a high friction material 446 disposed about an angled portion of the head, which may improve a sliding ability of the head 440 to slide along edge boundaries. One or more sensors 444 or other components may be disposed in or on the head 440, such as proximity sensors, force sensors, and so forth that allow the tennis ball retrieval robot 400 to determine when the tennis ball retrieval robot 400 is adjacent to an edge boundary or other obstacle. The head 440 may include one or more wheels 448, such as caster wheels, to allow the head 440 to move along the ground. The wheels 448 may be passive or actively driven.

Accordingly, the tennis ball retrieval robot 400 may have a housing with a ball inlet, and a first wheel coupled to the housing, such as the wheel 480. The tennis ball retrieval robot 400 may include a motor disposed in the housing and configured to rotate the first wheel, and a second wheel coupled to the ball collection portion 470, such as the guide wheels 482, where the second wheel may be a passive wheel. The tennis ball retrieval robot 400 may include a ball collection portion coupled to the housing and configured to receive a plurality of balls, and an optional bag removably coupled to the ball collection portion, such as that illustrated in FIG. 9. The tennis ball retrieval robot 400 may include a first arm removably coupled to the housing, and a second arm removably coupled to the housing, where the first arm and the second arm together guide balls towards the ball inlet. An angle between the first arm and the second arm may be adjustable in some embodiments. The tennis ball retrieval robot 400 may include a battery disposed in the housing, and a detachable power cord configured to couple sensors in the arm(s) to the battery. The tennis ball retrieval robot 400 may include a ball direction device configured to direct balls from the ball inlet to the ball collection portion. The ball direction device may include a wheel or ball roller having a high friction surface, where the wheel or ball roller is configured to engage outer surfaces of balls. The tennis ball retrieval robot 400 may include a first sensor coupled to the first arm, where the tennis ball retrieval robot is configured to detect obstacles using the first sensor. The tennis ball retrieval robot 400 may include a second sensor coupled to the housing, such as a camera sensor, an ultrasonic sensor, or another type of sensor, where the tennis ball retrieval robot 400 is configured to navigate autonomously using the first sensor and/or the second sensor.

Figure 5:
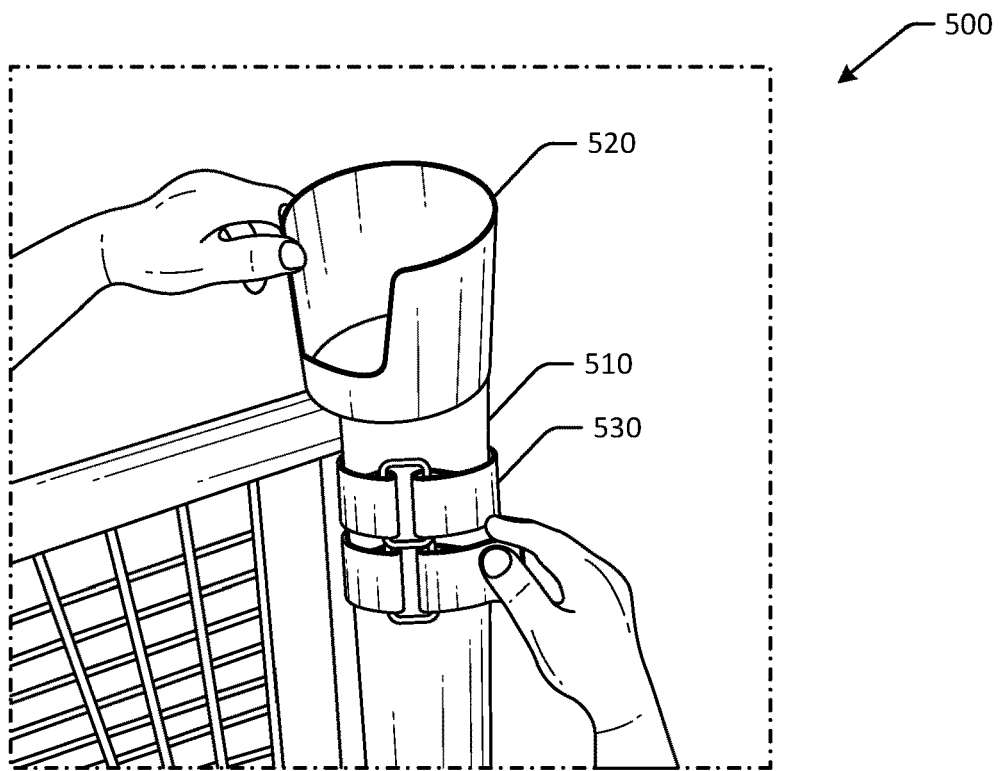
FIG. 5 is a schematic illustration of an example base station coupled to a tennis net structure in accordance with one or more example embodiments of the disclosure.
Figure 5:
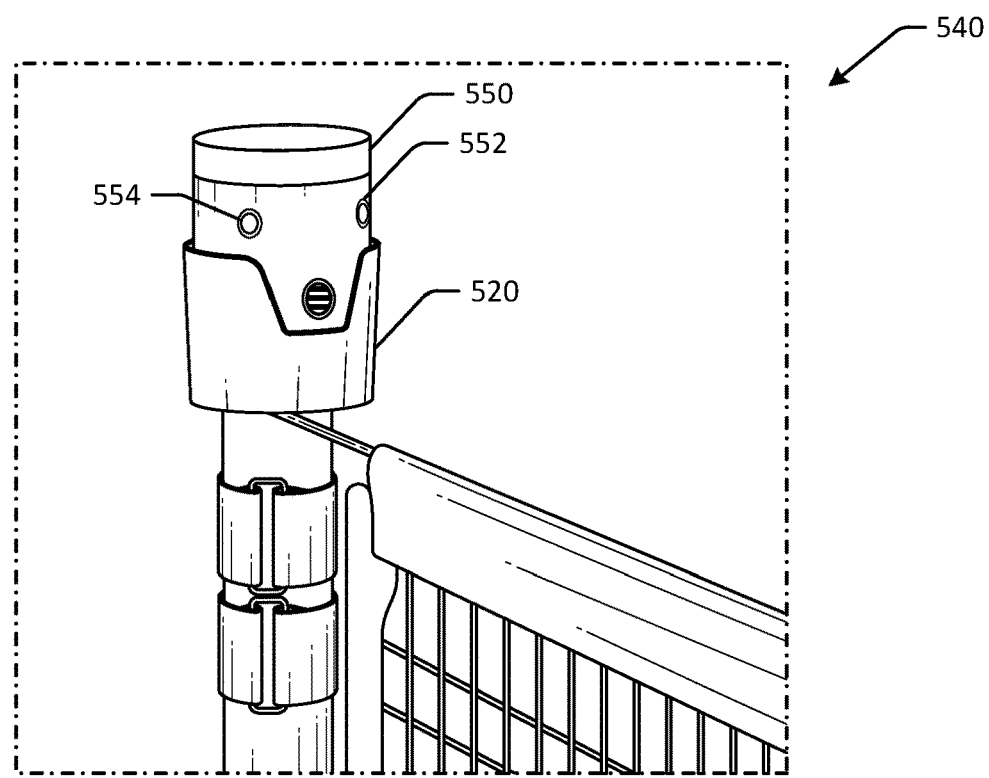

FIG. 5 is a schematic illustration of an example base station 550 coupled to a tennis net structure in accordance with one or more example embodiments of the disclosure. Other embodiments may include different and/or additional or fewer components or operations than those illustrated in FIG. 5. The base station 550 may be the same base station discussed with respect to FIGS. 1-4.

At a first operation 500 in FIG. 5, a base station holder 520 may be secured to a net post 510, such as a net post of a tennis court, or another structure disposed on or adjacent to a tennis court. The base station holder 520 may be configured to support a base station coupled thereto. In some embodiments, the base station holder 520 may include one or more apertures in a base platform to allow rain or other liquid to pass through instead of accumulating in the base station holder 520 when the base station is not disposed in the base station holder 520. The base station holder 520 may be secured to the net post 510 using one or more straps 530. The base station holder 520 may remain coupled to the net post 510 even when the base station is removed.

At a second operation 540, the base station 550 may be removably coupled to the base station holder 520. The base station 550 may be positioned in the base station holder 520 such that a first camera 552 and a second camera 554 are oriented toward the tennis court. The base station holder 520 may include one or more cutouts, such as that depicted in the example of FIG. 5, to allow for heat dissipation and/or ambient environment exposure of additional sensors or components of the base station 550.

Figure 6A:
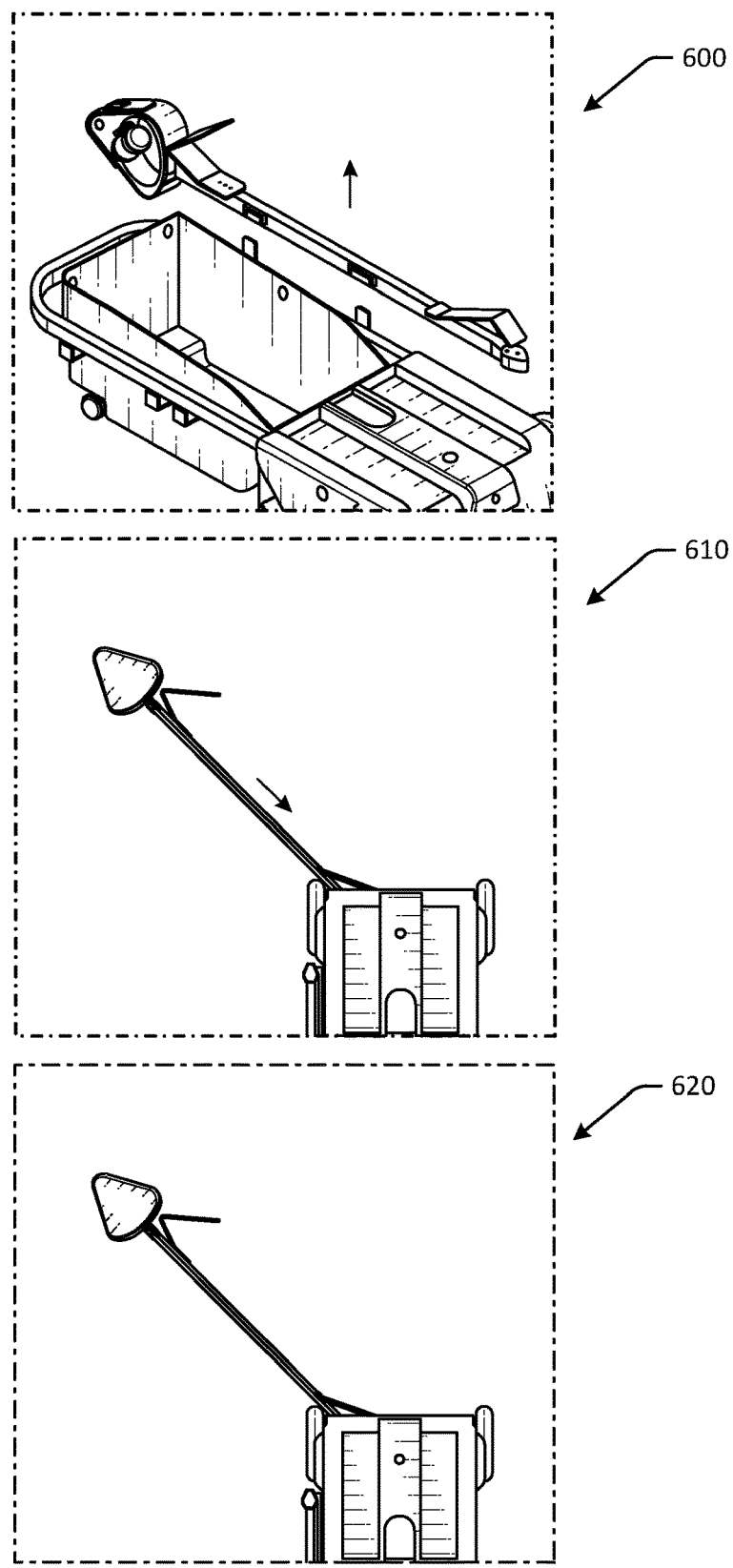
FIGS. 6A-6B are schematic illustrations of an example set up process for an autonomous tennis ball retrieval robot in accordance with one or more example embodiments of the disclosure.
Figure 6B:
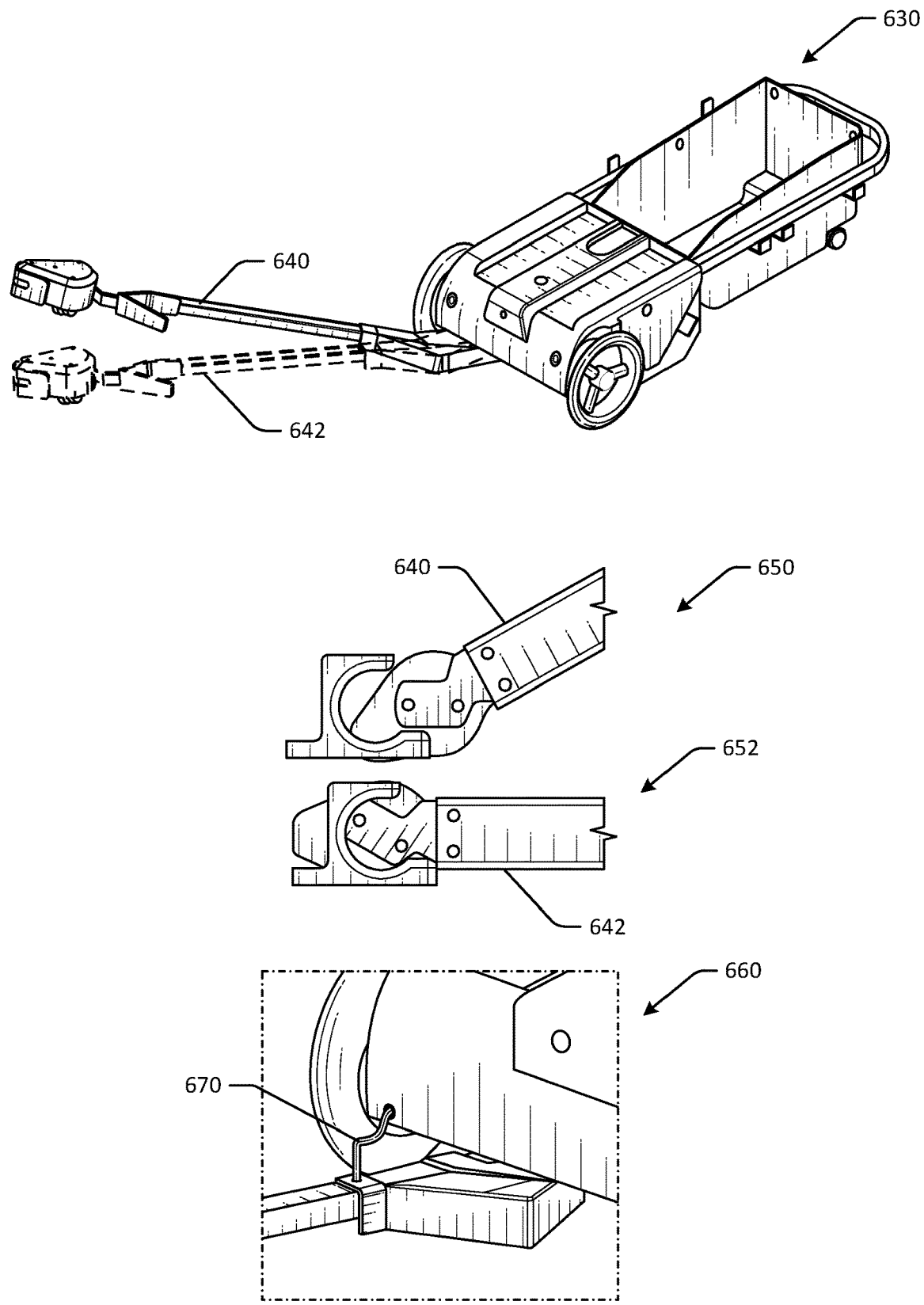

FIGS. 6A-6B are schematic illustrations of an example set up process for an autonomous tennis ball retrieval robot in accordance with one or more example embodiments of the disclosure. Other embodiments may include different and/or additional or fewer components or operations than those illustrated in FIGS. 6A-6B.

In FIG. 6A, at a first instance 600, arms of the tennis ball retrieval robot may be removed from a secured position. The arms may be secured to the housing of the tennis ball retrieval robot for transport. The tennis ball retrieval robot may be positioned on a ground surface, and the arms may be removed.

At a second instance 610, the arms may be positioned into their respective slots on the housing of the tennis ball retrieval robot. The arms may be slid towards the housing of the tennis ball retrieval robot to engage and may be secured using any suitable coupling mechanism. At a third instance 620, the arm is depicted in the coupled position. The same engagement process may be used to engage a second arm of the tennis ball retrieval robot.

As depicted in FIG. 6B, in some embodiments, the arm of the tennis ball retrieval robot may be coupled to the housing of the tennis ball retrieval robot at a fourth instance 630, during which the arm may first be inserted at an inclined angle 640, and then lowered to a ground level 642 to couple the arm to the housing. As illustrated in detail view 650, the arm may be coupled via rotation of the arm between the inclined angle 640 and the flat or ground level orientation 642 as illustrated in detail view 652.

After the arm is coupled, at a fifth instance 660, a power cord 670 may be coupled to the arm. The power cord 670 may provide power for one or more sensors, motors, or other components disposed in or otherwise coupled to the arm. The same process may be used to couple the second arm of the tennis ball retrieval robot. After the arms are coupled, the tennis ball retrieval robot may be ready for use.

Figure 7:
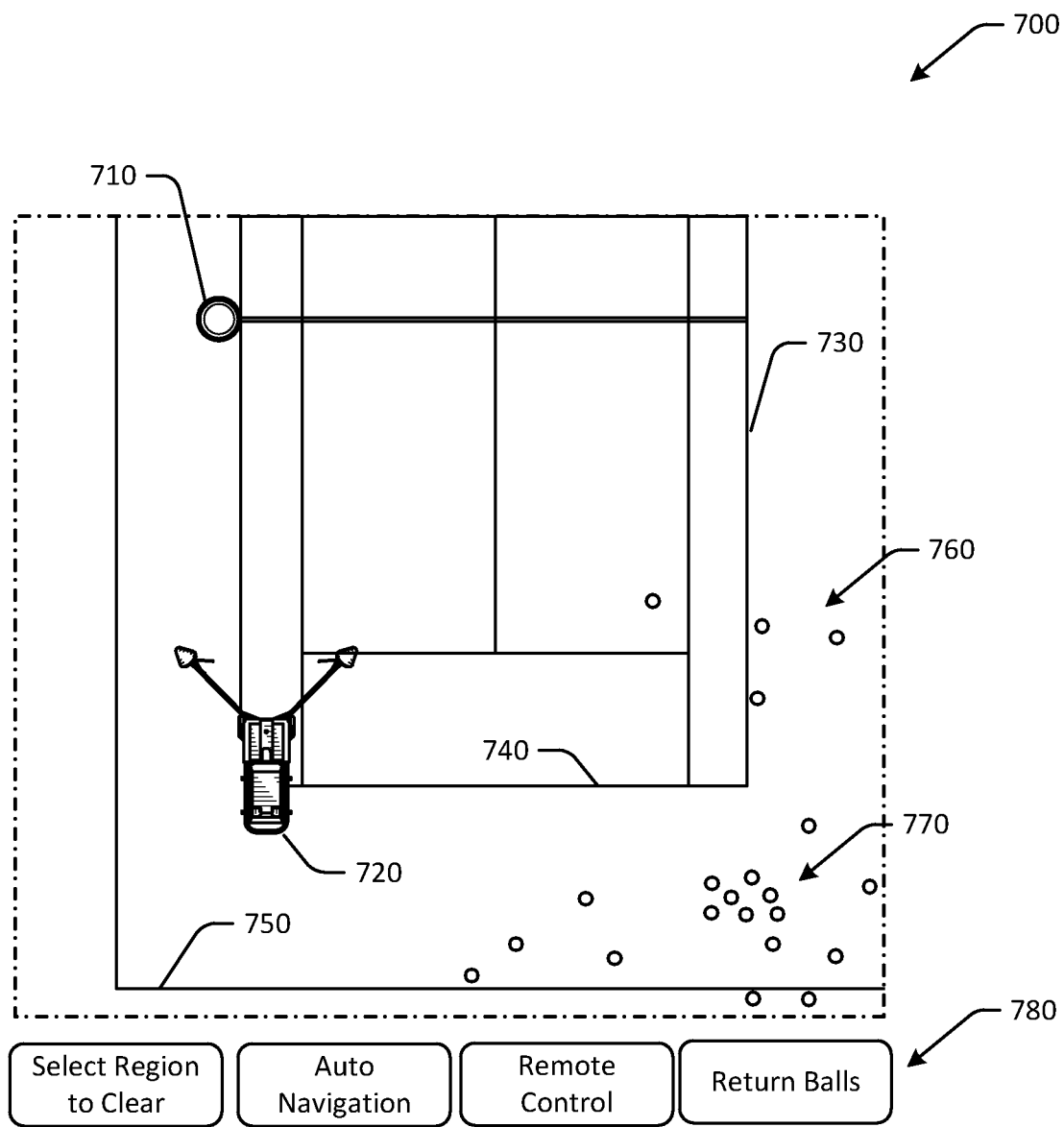
FIG. 7 is a schematic illustration of generation and presentation of an example user interface for interaction with an autonomous tennis assistant system in accordance with one or more example embodiments of the disclosure.

FIG. 7 is a schematic illustration of generation and presentation of an example user interface 700 for interaction with an autonomous tennis assistant system in accordance with one or more example embodiments of the disclosure. While example embodiments of the disclosure may be described in the context of user interfaces presented at a user device, it should be appreciated that the disclosure is more broadly applicable to any suitable user interface. Other embodiments may include different elements than those depicted in the example of FIG. 7.

In FIG. 7, the user interface 700 may be generated by one or more of a base station, a tennis ball retrieval robot, and/or a remote server. The user interface 700 may be presented at a user device, such as a mobile phone of a user in the vicinity of the base station and/or tennis ball retrieval robot.

The user interface 700 may include a digital representation of the tennis court. The user interface 700 may be based at least in part on images captured by a base station 710 and/or a tennis ball retrieval robot 720. The user interface 700 may be generated at the base station 710, the tennis ball retrieval robot 720, the user device, and/or a remote server and may be presented at the user device. The user interface 700 may include representations of the base station 710 and the tennis ball retrieval robot 720, and may reflect the current real-world positioning of the components on the tennis court. In some embodiments, the base station 710 may determine a physical location of the tennis ball retrieval robot 720, where the digital representation of the tennis court includes the tennis ball retrieval robot at coordinates corresponding to the physical location, where the user interface is updated as the tennis ball retrieval robot 720 moves. In some embodiments, the tennis ball retrieval robot 720 may localize itself. For example, the base station 710 may send data associated with the digital representation to the tennis ball retrieval robot 720, where the tennis ball retrieval robot 720 may be configured to use the data to determine a position of the tennis ball retrieval robot 720 in the digital representation.

The user interface 700 may include one or more landmarks, such as a net, one or more tennis court boundary lines 730, 740, one or more edge boundaries 750, such as a fence, and so forth. Other embodiments may include different elements. Landmarks may be represented via physical location coordinates on the user interface 700, where the positioning of the landmarks reflects the physical location coordinates associated with the respective landmarks. Other embodiments may include one landmark, no landmarks, or a different number of landmarks.

The user interface 700 may display one or more tennis balls in their respective locations as detected by one or more cameras of the base station 710 and/or the tennis ball retrieval robot 720. In some embodiments, the tennis balls may be presented as clusters instead of individually. For example, a first cluster of tennis balls 770 may be presented as a single graphical element instead of individual tennis balls. In other embodiments, the tennis balls may be presented individually as depicted in the example of FIG. 7. Users may select regions on the user interface 700 for the tennis ball retrieval robot 720 to go retrieve tennis balls. For example, the user may select the first cluster 770 and/or the individual tennis balls in a second region 760 for clearing. The tennis ball retrieval robot 720 may determine the user input and may autonomously navigate to the selected regions to retrieve the tennis balls.

The user interface 700 may include one or more selectable options 780 that may be selected by a user. For example, the selectable options 780 may include a "select region to clear" option, an "auto navigation" option, a "remote control" option, a "return balls" option, and/or other options. The "select region to clear" option may be used to select a region of the tennis court, such as the first cluster of tennis balls 770, to clear, and may cause the tennis ball retrieval robot 720 to autonomously navigate to the selected region. The "auto navigation" option may be selected to cause the tennis ball retrieval robot 720 to navigate and detect tennis balls autonomously with or without input from the base station 710. For example, if the user is continuously playing and doesn't want a specific region to be cleared, and instead wants the tennis ball retrieval robot 720 to continuously detect and retrieve balls, the "auto navigation" option may be selected. The "remote control" option may be used to present a directional pad user interface that allows the user to manually direct movement of the tennis ball retrieval robot 720. For example, a navigation menu may be presented at the user device, where inputs at the user device cause the tennis ball retrieval robot 720 to move on the tennis court. In some embodiments, the base station 710 may cause presentation of a navigation menu at the user device, receive, from the user device, data associated with user inputs at the navigation menu, and cause the tennis ball retrieval robot 720 to move on the tennis court based at least in part on the data received from the user device. The "return balls" option may be used to cause the tennis ball retrieval robot to initiate ejecting balls towards a user for embodiments that are configured to both retrieve and eject tennis balls. For example, the balls may be ejected towards the user to allow the user to practice playing tennis without a human opponent.

To communicate, a local wireless network or hotspot may be broadcast by the base station 710 and/or the tennis ball retrieval robot 720. The user device, base station 710, and tennis ball retrieval robot 720 may join the wireless network, which may allow for wireless communication amongst the components. For example, a controller at the base station 710 and/or at the tennis ball retrieval robot 720 (depending on which component is broadcasting the network), may be configured to broadcast a wireless network, determine that the tennis ball retrieval robot 720 is connected to the wireless network, determine that the base station 710 is connected to the wireless network, and/or determine that the user device is connected to the wireless network.

During retrieval of tennis balls, whether in the autonomous navigation mode and/or in instances where a user has selected a specific region to clear, the tennis ball retrieval robot 720 may prioritize retrieval of clusters of tennis balls instead of individual tennis balls. For example, a controller at the base station 710 and/or the tennis ball retrieval robot 720 may determine that a plurality of tennis balls are disposed within a distance of each other, or of a first tennis ball. For example, if there are three tennis balls, where each tennis ball is within a predetermined distance of at least one other tennis ball (e.g., 18", etc.), the three tennis balls may be identified as a cluster. In some embodiments, the predetermined distance may vary based on a total number of tennis balls detected on the tennis court, where the greater the number of tennis balls, the shorter the predetermined distance is. In some embodiments, clusters may be determined and/or identified prior to initiating movement of the tennis ball retrieval robot 720.

Accordingly, the tennis ball retrieval robot 720 and/or the base station 710 may determine a first location of a first tennis ball, cause the tennis ball retrieval robot 720 to move to the first location, determine a second location of a second tennis ball, optionally determine that the second location is within a distance of the first location, and cause the tennis ball retrieval robot to move to the second location to retrieve the second tennis ball.

In some embodiments, edge boundaries may be identified using computer vision processing of images captured using cameras at the tennis ball retrieval robot 720 and/or the base station 710, as well as sensor feedback from sensors at the tennis ball retrieval robot 720, such as proximity sensors, ultrasonic sensors, and so forth. The controller at the tennis ball retrieval robot 720 (or in some embodiments at the base station 710) may therefore determine an edge boundary of the tennis court. To retrieve tennis balls near the edge boundary, such as a fence, the controller may determine that a location of a tennis ball is within a distance of the edge boundary, and may cause a configuration of the tennis ball retrieval robot to change from a first configuration to a second configuration. Configuration changes may include changes to an angle between the arms of the tennis ball retrieval robot 720, changes in movement speed of the tennis ball retrieval robot 720, changes to operational mode, and/or other configuration changes. For example, the second configuration of the tennis ball retrieval robot may have a different arm positioning than the first configuration, and/or a different speed of movement of the tennis ball retrieval robot 720.

FIG. 8 is a schematic illustration of an autonomous tennis ball retrieval robot in a portable mode in accordance with one or more example embodiments of the disclosure. Other embodiments may include different and/or additional or fewer components or operations than those illustrated in FIG. 8.

At a first operation 800 in FIG. 8, the arms of the tennis ball retrieval robot may be removed from a front end of the tennis ball retrieval robot, and may be returned to a secure position adjacent to the respective sides of the tennis ball retrieval robot. The arms may be secured using any suitable securing component, such as clamps, friction fit, buckles, straps, and so forth.

At operation 810, the tennis ball retrieval robot may be lifted by its frame, where the frame can be used as a handle to push and/or pull the tennis ball retrieval robot. Once lifted, the tennis ball retrieval robot may be rolled and/or transported in a portable mode by rolling along its wheel(s) 820. In the portable mode, the ball collection device may rotate to be substantially horizontal or horizontal, such that the tennis balls do not fall out of the ball collection device. Accordingly, the ball collection device may be configured to rotate with respect to the frame of the tennis ball retrieval robot in some embodiments.

Figure 9:
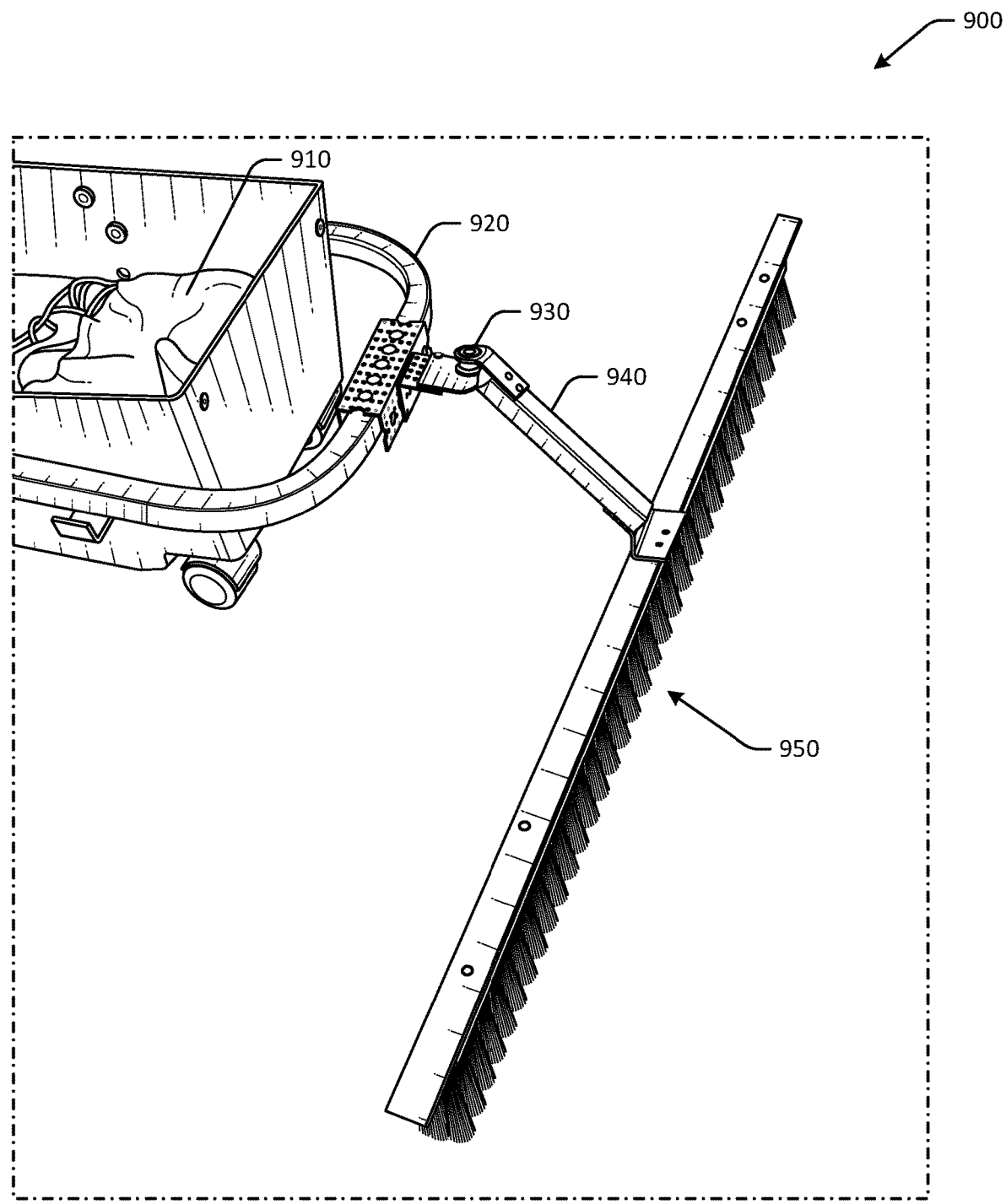
FIG. 9 is a schematic illustration of an autonomous tennis ball retrieval robot with a clay court sweeping attachment in accordance with one or more example embodiments of the disclosure.

FIG. 9 is a schematic illustration of an autonomous tennis ball retrieval robot 900 with a clay court sweeping attachment in accordance with one or more example embodiments of the disclosure. Other embodiments may include different types of attachments, such as rake-type attachments, that may be used instead of the clay court sweeping attachment depicted in the example of FIG. 9.

In FIG. 9, the tennis ball retrieval robot 900 is depicted with a clay court sweeping device 950. The clay court sweeping device 950 may be used to sweep tennis balls along a clay tennis court in a certain direction, as retrieval of tennis balls on clay courts may be difficult due to the compressive nature of the clay. The clay court sweeping device 950 may include one or more bristles that brush along the clay court to move tennis balls in a certain direction.

The tennis ball retrieval robot 900 may include a bag 910 disposed in a ball collection portion of the tennis ball retrieval robot 900. The bag 910 may be removably coupled to the ball collection portion. In some embodiments, the bag 910 may be a net bag and/or formed of a net material. The tennis ball retrieval robot 900 may include a frame 920 that may or may not form a part of the housing of the tennis ball retrieval robot 900. The clay court sweeping device 950 may be coupled to the frame 920 of the tennis ball retrieval robot 900. In some embodiments, the clay court sweeping device 950 may be coupled to the tennis ball retrieval robot 900 along the frame 920 or another portion of the housing. The clay court sweeping device 950 may include an attachment portion that engages the frame 920. The clay court sweeping device 950 may include a joint 930 about which an angle of orientation of the clay court sweeping device 950 can be modified. The joint 930 may be passive or actively controlled. The clay court sweeping device 950 may include a member 940 between the joint 930 and the bristles portion of the clay court sweeping device 950. The member 940 may be disposed at a fixed angle to allow for a predetermined amount of contact between the bristles and the clay court. During operation, the tennis ball retrieval robot 900 may move in a rearward direction to guide tennis balls to a certain area (e.g., an area selected by a user and/or predetermined area designated during a previous visit to the tennis court, etc.) of the tennis court. Instead of navigating to guide tennis balls between the arms of the tennis ball retrieval robot 900, the tennis ball retrieval robot 900 may navigate to guide tennis balls into contact with the clay court sweeping device 950.

Figure 10:
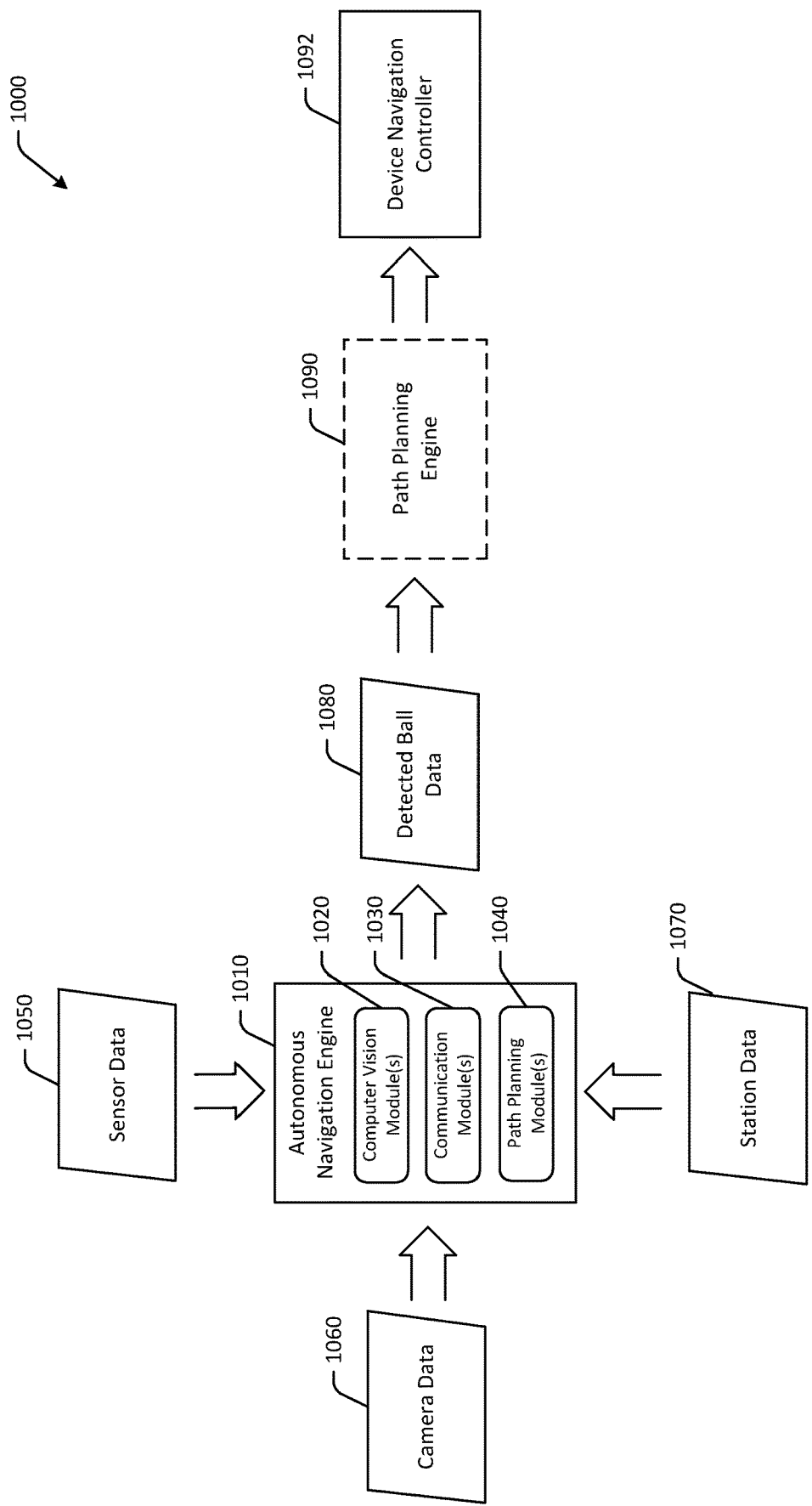
FIG. 10 is a schematic hybrid illustration of an example process and data flow for an autonomous tennis assistant system in accordance with one or more example embodiments of the disclosure.

FIG. 10 is a schematic hybrid illustration of an example process and data flow 1000 for an autonomous tennis assistant system in accordance with one or more example embodiments of the disclosure. Different embodiments may include different, additional, or fewer components and/or inputs or outputs than those illustrated in the example of FIG. 10. In some embodiments, the components of FIG. 10 may be stored and/or executed at a tennis ball retrieval robot, at a base station, at a remote server, and/or across one or more distributed computer systems. Depending on the architecture of the system, various data and/or outputs may be wirelessly communicated across components of an autonomous tennis assistant system.

An autonomous navigation engine 1010 may be configured to guide movement of a tennis ball retrieval robot. The autonomous navigation engine 1010 may be stored at and/or executed by one or more remote servers, at a base station, and/or at a tennis ball retrieval robot. The autonomous navigation engine 1010 may include one or more modules or algorithms, and may be configured to guide movement and/or plan a path of movement for a tennis ball retrieval robot.

For example, the autonomous navigation engine 1010 may include one or more computer vision module(s) 1020, one or more communication module(s) 1030, and/or one or more path planning module(s) 1040. Additional or fewer, or different, modules may be included. The computer vision module(s) 1020 may be configured to process and/or analyze images captured by one or more cameras. For example, the computer vision module(s) 1020 may be configured to determine frames or sets of frames of video or images captured by cameras at a base station and/or at a tennis ball retrieval robot. The computer vision module(s) 1020 may be configured to detect the presence of tennis balls in the frames. The computer vision module(s) 1020 may be configured to detect or analyze images to determine a number of tennis balls in a certain region, as well as determine the location of clusters of tennis balls. Clusters may be defined as a number of tennis balls in a region that is greater than a number of tennis balls in another region (e.g., clusters may be relative) and/or as a predetermined number of tennis balls within a certain distance of each other, such as 5 tennis balls within 12 inches of at least one other tennis ball. Computer vision module(s) 1020 may include one or more object recognition algorithms configured to detect at least one of a ball, a boundary of a tennis court, an edge boundary, and/or other features.

The communication module(s) 1030 may be configured to communicate data with other computer systems. For example, outputs of the autonomous navigation engine 1010 may be sent to other computer systems by the communication module(s) 1030. Various inputs of the autonomous navigation engine 1010 may be retrieved and/or requested by the communication module(s) 1030.

The path planning module(s) 1040 may be configured to determine, based at least in part on locations of tennis balls and/or clusters of tennis balls, a path of movement for a tennis ball retrieval robot through an environment. For example, output of the computer vision module(s) 1020 may be used by the path planning module(s) 1040 to plan a path of movement through an environment. The path may be configured to guide the tennis ball retrieval robot around any obstacles in the environment to retrieve tennis balls. The path planning module(s) 1040 may be configured to update a planned path in or near real-time as obstacles are detected, such as a human in the vicinity of the tennis retrieval robot, and so forth. In some embodiments, the path planning module(s) 1040 may be configured to implement one or more machine learning algorithms and/or neural networks to determine optimized paths in an environment and/or to update planned paths.

The autonomous navigation engine 1010 may receive one or more inputs, and may be configured to output detected ball data 1080. The detected ball data 1080 may be location or positional data (e.g., positional data relative to a position of the tennis ball retrieval robot, etc.) of one or more tennis balls for retrieval. For example, the autonomous navigation engine 1010 may receive one or more of sensor data 1050 associated with sensors disposed at a tennis ball retrieval robot and/or base station, camera data 1060 associated with cameras disposed at the tennis ball retrieval robot and/or base station, and/or station data 1070 associated with one or more controllers at a base station. In some embodiments, one or more of the sensor data 1050, camera data 1060, and/or station data 1070 may be generated at a tennis ball retrieval robot and processed at a base station or remote server, and in other embodiments, such data may be processed at the tennis ball retrieval robot.

The autonomous navigation engine 1010 may process the respective data and output the detected ball data 1080. For example, the sensor data 1050 may be processed using one or more of the computer vision module(s) 1020, the communication module(s) 1030, and/or the path planning module(s) 1040. Likewise, the camera data 1060 and/or the station data 1070 may be processed using one or more of the modules or algorithms of the autonomous navigation engine 1010.

Using one or more algorithms or modules, the autonomous navigation engine 1010 may output the detected ball data 1080. The detected ball data 1080 may indicate the location of one or more tennis balls and/or clusters of tennis balls to be retrieved by the tennis ball retrieval robot. The detected ball data 1080 may be optionally input at a path planning engine 1090. In some embodiments that implement a distributed computing environment, the path planning engine 1090 may be executed at a separate computing system, such as at a remote server.

The detected ball data 1080 may otherwise be sent and/or input at a device navigation controller 1092, such as a controller of the tennis ball retrieval robot. The device navigation controller 1092 may execute the planned path and/or autonomously updated path to cause the tennis ball retrieval robot to move through an environment. In embodiments where the path planning engine 1090 is used, the output of the path planning engine 1090 may be input at the device navigation controller 1092, whereas in other embodiments, the detected ball data 1080 may be input at the device navigation controller 1092.

The tennis ball retrieval robot may therefore autonomously navigate through an environment to detect tennis balls and to retrieve detected tennis balls in an environment without user input.

Figure 11:
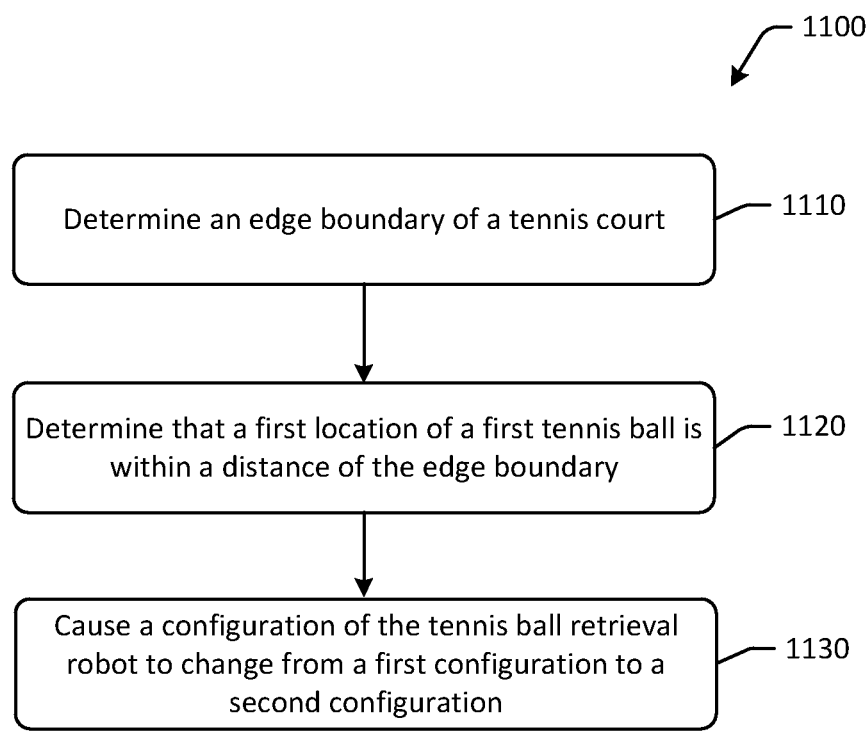
FIG. 11 is a schematic illustration of an example process flow for retrieval of tennis balls along boundaries in accordance with one or more example embodiments of the disclosure.

FIG. 11 is a schematic illustration of an example process flow 1100 for retrieval of tennis balls along boundaries in accordance with one or more example embodiments of the disclosure. While example embodiments of the disclosure may be described in the context of tennis balls and fences, it should be appreciated that the disclosure is more broadly applicable to any suitable type of round object for retrieval, and any other suitable boundary, such as walls, nets, etc. Some or all of the blocks of the process flows in this disclosure may be optional and may be performed in a distributed manner across any number of devices. The operations of the process flow 1100 may be performed in a different order.

At block 1110 of the process flow 1100, computer-executable instructions stored on a memory of a device, such as a remote server, a tennis ball retrieval robot, or a base station, may be executed to determine an edge boundary of a tennis court. For example, an edge boundary may be a wall, a fence, a net, or another vertical obstacle that may limit movement of a tennis retrieval robot in at least one direction. To determine the edge boundary, in some embodiments, a base station may capture one or more images of a tennis court area and may identify the edge boundary using computer vision. In other embodiments, the images may be sent to one or more remote servers for processing and corresponding coordinates of an edge boundary may be received by the base station and/or tennis retrieval robot. There may be more than one edge boundary, such as fences along both a lateral axis and longitudinal axis of the tennis court. In some instances, locations of edge boundaries may be identified by a user via one or more inputs at a user device. User inputs at a device may be communicated with a base station and/or tennis ball retrieval robot via wireless communication. Location coordinates may be determined as absolute positioning values or relative to components. For example, positional data may be relative to a current positioning of a tennis ball retrieval robot.

In some embodiments, edge boundaries may be determined based at least in part on data collected by a tennis ball retrieval robot. For example, during movement, the tennis ball retrieval robot may detect an obstacle, which may be the edge boundary, and may map the obstacle location based on camera and/or other sensor feedback during movement. In one example, sensor feedback at an arm of the tennis ball retrieval robot may be used to determine that the edge boundary is present, and as the tennis ball retrieval robot moves along the edge boundary, the dimensions of the edge boundary may be determined.

At block 1120 of the process flow 1100, computer-executable instructions stored on a memory of a device, such as a remote server, a tennis ball retrieval robot, or a base station, may be executed to determine that a first location of a first tennis ball is within a distance of the edge boundary. For example, a base station may capture one or more images of a tennis court area and may identify a first location of a first tennis ball, a second location of a tennis ball, and so forth. In other embodiments, the tennis ball retrieval robot may determine the first location locally, and/or a remote server may process one or more images and determine the first location. The first location of the first location may be determined to be within a predetermined distance, such as a number of inches or feet, from the edge boundary. The predetermined distance may be a distance between the heads of the arms of the tennis ball retrieval robot in one example.

At block 1130 of the process flow 1100, computer-executable instructions stored on a memory of a device, such as a remote server, a tennis ball retrieval robot, or a base station, may be executed to cause a configuration of the tennis ball retrieval robot to change from a first configuration to a second configuration. For example, the base station may send one or more commands to the tennis ball retrieval robot to modify a configuration of one or more components. In other embodiments, the tennis ball retrieval robot may determine the edge boundary on its own, and may modify its configuration autonomously. Changes in configuration may include a change in the angle between the arms of the tennis ball retrieval robot, a change in speed of operation of the tennis ball retrieval robot, a change in sensor measurement time intervals at the tennis ball retrieval robot, and/or other configuration changes. For example, an angle between the arms of the tennis ball retrieval robot may be reduced or narrowed, so as to facilitate collection of balls along the edge boundary. In another example, a speed of movement may be reduced so as to avoid collision at high speed with the edge boundary and/or tennis balls being inadvertently pushed away from the collection target area, and so forth. In another example, a change in sensor measurement time may be a reduction in time interval, so as to collect more granular data related to positioning of the edge boundary.

Accordingly, the process flow 1100 may be executed by one or more components of an autonomous tennis assistant system to collect or retrieve tennis balls disposed at or near an edge boundary of a tennis court. The operations of the process flow 1100 may allow for retrieval of most or all tennis balls while preventing tennis balls from bouncing against the edge boundary and/or damaging the tennis ball retrieval robot.

Figure 12:
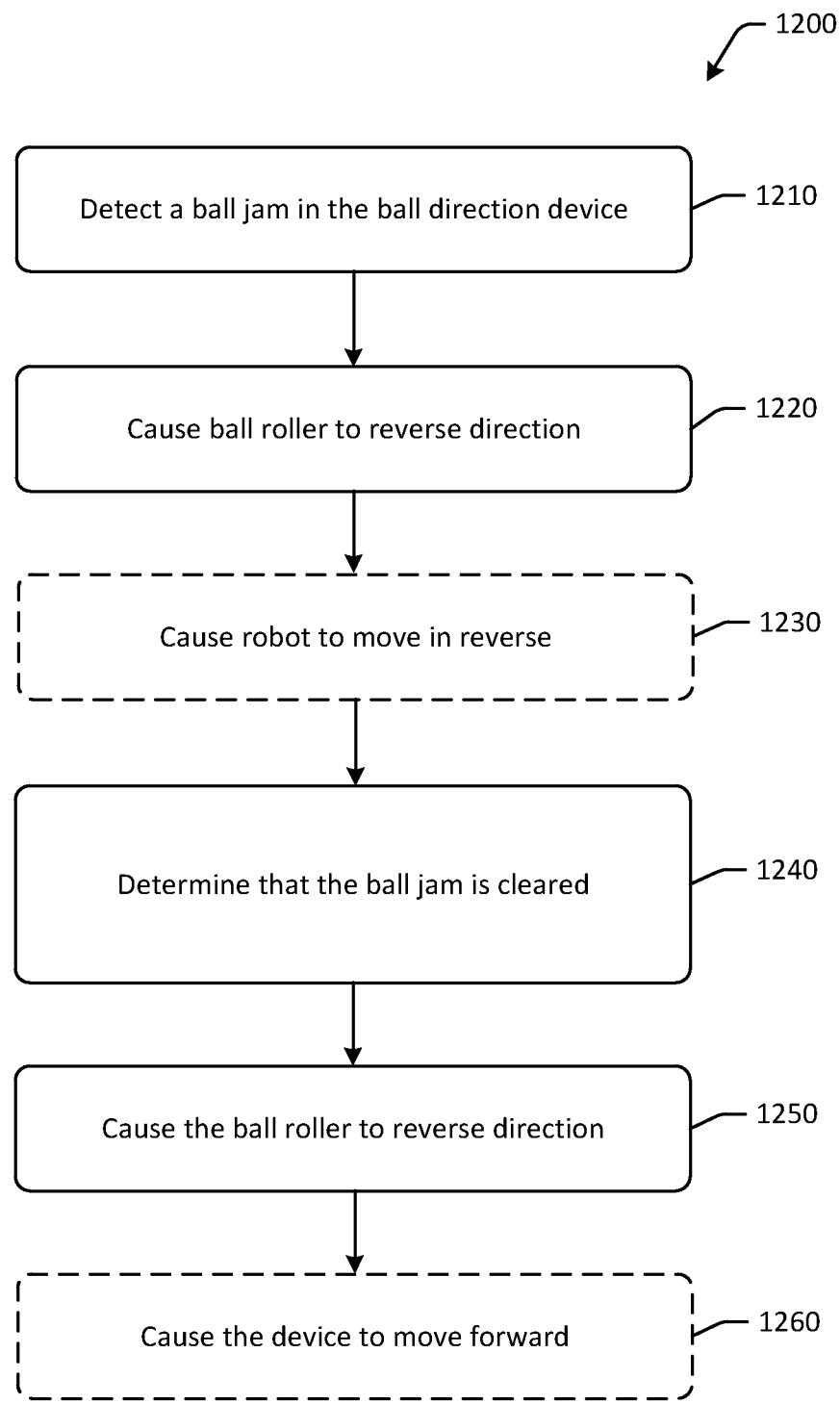
FIG. 12 is a schematic illustration of an example process flow for clearing ball jams at an autonomous tennis ball retrieval robot in accordance with one or more example embodiments of the disclosure.

FIG. 12 is a schematic illustration of an example process flow 1200 for clearing ball jams at an autonomous tennis ball retrieval robot in accordance with one or more example embodiments of the disclosure. While example embodiments of the disclosure may be described in the context of tennis balls, it should be appreciated that the disclosure is more broadly applicable to any suitable type of object for retrieval. Some or all of the blocks of the process flows in this disclosure may be optional and may be performed in a distributed manner across any number of devices. The operations of the process flow 1200 may be performed in a different order.

At block 1210 of the process flow 1200, computer-executable instructions stored on a memory of a device, such as a remote server, a tennis ball retrieval robot, or a base station, may be executed to detect a ball jam in a ball direction device of a tennis ball retrieval robot. For example, the tennis ball retrieval robot may detect a ball jam in the ball direction device based at least in part on feedback from a ball roller of the ball direction device, where the ball roller may be configured to propel balls up and/or in a rearward into the ball collection device or ball collection portion of the tennis ball retrieval robot. Feedback from the ball roller may include a stop in movement of the ball roller, which may indicate that a ball is jammed at the ball direction device. Jams may occur between the ball roller and a ground surface and/or between a roller and the ball direction device or another component of the tennis ball retrieval robot. In some embodiments, jams may be detected locally at the tennis ball retrieval robot, such as by a controller of the tennis ball retrieval robot and/or one or more computer processors coupled to memory at the tennis ball retrieval robot.

At block 1220 of the process flow 1200, computer-executable instructions stored on a memory of a device, such as a remote server, a tennis ball retrieval robot, or a base station, may be executed to cause a ball roller of the tennis ball retrieval robot to reverse direction. For example, a controller at the tennis ball retrieval robot may cause the ball roller of the tennis ball retrieval robot to move in a direction opposite that of its original rotation. For instance, the ball roller may typically move in a direction that results in tennis balls being propelled toward a rear of the tennis ball retrieval robot. Reversal of the ball roller may cause a jammed tennis ball to move or be propelled toward a front of the tennis ball retrieval robot (e.g., toward the arms of the tennis ball retrieval robot instead of towards the ball collection device, etc.). In one embodiment, a ball roller may switch from a forward rotation to a reverse rotation to free a jammed tennis ball. Accordingly, the ball roller may move in a first direction during normal operation, but when a jam is detected, the controller or a connected computer system may cause the ball roller to move in a second direction that is opposite the first direction.

At optional block 1230 of the process flow 1200, computer-executable instructions stored on a memory of a device, such as a remote server, a tennis ball retrieval robot, or a base station, may be executed to cause the tennis ball retrieval robot to move in a reverse direction. For example, the controller of the tennis ball retrieval robot may cause the tennis ball retrieval robot to move backward instead of forward, which may provide additional jam clearing functionality by making it easier for a jammed tennis ball to be propelled toward a front of the tennis ball retrieval robot. In some embodiments, the operation of block 1230 may be performed if a jam remains after the ball roller has been moving in the reverse direction (e.g., as described with respect to block 1220, etc.) for a certain amount of time, such as 3 seconds. In other embodiments, the operation of block 1230 may be performed at the same time as the operation of block 1220. Some embodiments may not perform the optional operation of block 1230.

At block 1240 of the process flow 1200, computer-executable instructions stored on a memory of a device, such as a remote server, a tennis ball retrieval robot, or a base station, may be executed to determine that the ball jam is cleared. For example, the controller of the tennis ball retrieval robot may determine that the ball jam is cleared based at least in part on feedback from the ball roller, which may be represented as a change in speed and/or friction detected at the ball roller. In other embodiments, different sensor feedback, such as proximity sensor feedback from a sensor disposed adjacent to the ball roller may be used to determine whether a jam is present and/or whether a jam is cleared.

At block 1250 of the process flow 1200, computer-executable instructions stored on a memory of a device, such as a remote server, a tennis ball retrieval robot, or a base station, may be executed to cause a ball roller of the tennis ball retrieval robot to reverse direction again. For example, a controller at the tennis ball retrieval robot may cause the ball roller of the tennis ball retrieval robot to move in a direction corresponding to its original rotation. For instance, the ball roller may resume normal operation, such as a direction that results in tennis balls being propelled toward a rear of the tennis ball retrieval robot.

At optional block 1260 of the process flow 1200, computer-executable instructions stored on a memory of a device, such as a remote server, a tennis ball retrieval robot, or a base station, may be executed to cause the tennis ball retrieval robot to move in a forward direction. For example, the controller of the tennis ball retrieval robot may cause the tennis ball retrieval robot to move forward, or to otherwise resume normal operation. In some embodiments, the tennis ball retrieval robot may be paused when a jam is detected, and may resume normal operation in a forward direction when the jam is cleared.

Accordingly, the operations of process flow 1200 may be performed by one or more computer systems to detect and clear jams at the tennis ball retrieval robot.

One or more operations of the methods, process flows, or use cases of FIGS. 1-12 may have been described above as being performed by a user device, or more specifically, by one or more program module(s), applications, or the like executing on a device. It should be appreciated, however, that any of the operations of the methods, process flows, or use cases of FIGS. 1-12 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-12 may be described in the context of the illustrative devices, it should be appreciated that such operations may be implemented in connection with numerous other device configurations.

The operations described and depicted in the illustrative methods, process flows, and use cases of FIGS. 1-12 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-12 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 13:
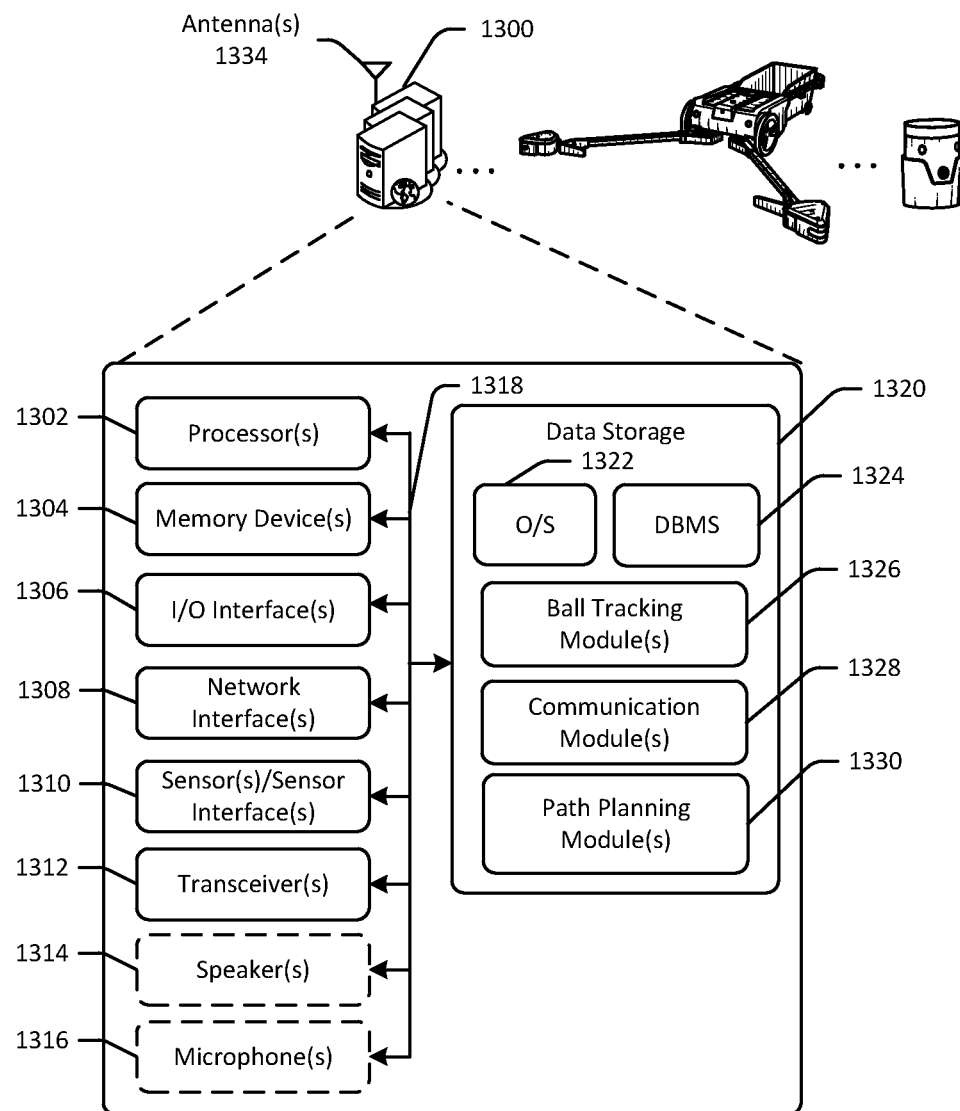
FIG. 13 is a schematic block diagram of an illustrative device in accordance with one or more example embodiments of the disclosure.

FIG. 13 is a schematic block diagram of a device 1300, such as a base station, an autonomous tennis ball retrieval robot, a remote server, a user device, and/or another device in communication with an autonomous tennis assistant system, in accordance with one or more example embodiments of the disclosure. The device 1300 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The device 1300 may correspond to an illustrative device configuration for the devices of FIGS. 1-12.

The device 1300 may be configured to communicate via one or more networks with one or more servers, user devices, or the like. In some embodiments, a single remote server or single group of remote servers may be configured to perform more than one type of path planning and/or navigation functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 1300 may include one or more processors (processor(s)) 1302, one or more memory devices 1304 (generically referred to herein as memory 1304), one or more input/output (I/O) interface(s) 1306, one or more network interface(s) 1308, one or more sensors or sensor interface(s) 1310, one or more transceivers 1312, one or more optional speakers 1314, one or more optional microphones 1316, and data storage 1320. The device 1300 may further include one or more buses 1318 that functionally couple various components of the device 1300. The device 1300 may further include one or more antenna(s) 1334 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1318 may include at least one of a system bus, a memory bus, an address bus, or a message bus, and may permit exchange of information (e.g., data (including computer-executable code), signaling, etc.) between various components of the device 1300. The bus(es) 1318 may include, without limitation, a memory bus or a memory controller, a peripheral bus, an accelerated graphics port, and so forth. The bus(es) 1318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1304 of the device 1300 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1320 may include removable storage and/or non-removable storage including, but not limited to, magnetic storage, optical disk storage, and/or tape storage. The data storage 1320 may provide non-volatile storage of computer-executable instructions and other data. The memory 1304 and the data storage 1320, removable and/or non-removable, are examples of computer-readable storage media (CRSM) as that term is used herein.

The data storage 1320 may store computer-executable code, instructions, or the like that may be loadable into the memory 1304 and executable by the processor(s) 1302 to cause the processor(s) 1302 to perform or initiate various operations. The data storage 1320 may additionally store data that may be copied to memory 1304 for use by the processor(s) 1302 during the execution of the computer-executable instructions. Moreover, output data generated as a result of execution of the computer-executable instructions by the processor(s) 1302 may be stored initially in memory 1304, and may ultimately be copied to data storage 1320 for non-volatile storage.

More specifically, the data storage 1320 may store one or more operating systems (O/S) 1322; one or more database management systems (DBMS) 1324; and one or more program module(s), applications, engines, computer-executable code, scripts, or the like such as, for example, one or more ball tracking module(s) 1326, one or more communication module(s) 1328, and/or one or more path planning module(s) 1330. Some or all of these module(s) may be sub-module(s). Any of the components depicted as being stored in data storage 1320 may include any combination of software, firmware, and/or hardware. The software and/or firmware may include computer-executable code, instructions, or the like that may be loaded into the memory 1304 for execution by one or more of the processor(s) 1302. Any of the components depicted as being stored in data storage 1320 may support functionality described in reference to correspondingly named components earlier in this disclosure.

The data storage 1320 may further store various types of data utilized by components of the device 1300. Any data stored in the data storage 1320 may be loaded into the memory 1304 for use by the processor(s) 1302 in executing computer-executable code. In addition, any data depicted as being stored in the data storage 1320 may potentially be stored in one or more datastore(s) and may be accessed via the DBMS 1324 and loaded in the memory 1304 for use by the processor(s) 1302 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 13, the datastore(s) may include, for example, user profile information, user preference information, and other information.

The processor(s) 1302 may be configured to access the memory 1304 and execute computer-executable instructions loaded therein. For example, the processor(s) 1302 may be configured to execute computer-executable instructions of the various program module(s), applications, engines, or the like of the device 1300 to cause or facilitate various operations to be performed in accordance with one or more embodiments of the disclosure. The processor(s) 1302 may include any suitable processing unit capable of accepting data as input, processing the input data in accordance with stored computer-executable instructions, and generating output data. The processor(s) 1302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1302 may be capable of supporting any of a variety of instruction sets.

Referring now to functionality supported by the various program module(s) depicted in FIG. 13, the ball tracking module(s) 1326 may include computer-executable instructions, code, or the like that responsive to execution by one or more of the processor(s) 1302 may perform functions including, but not limited to, determining ball location, performing computer vision on one or more images or video segments, determining clusters of balls, determining ball speed, determining top spin, determining type of stroke, and the like.

The communication module(s) 1328 may include computer-executable instructions, code, or the like that responsive to execution by one or more of the processor(s) 1302 may perform functions including, but not limited to, communicating with one or more devices, for example, via wired or wireless communication, communicating with remote servers, communicating with remote datastores, sending or receiving notifications, sending location data, determining localization parameters, determining device location, communicating with a base station and/or tennis retrieval robot, determining path planning values, and the like.

The path planning module(s) 1330 may include computer-executable instructions, code, or the like that responsive to execution by one or more of the processor(s) 1302 may perform functions including, but not limited to, analyzing location data, extracting frames, determining obstacle positioning, determining navigation values, determining optimal paths, determining boundaries, determining device speed, and the like.

Referring now to other illustrative components depicted as being stored in the data storage 1320, the O/S 1322 may be loaded from the data storage 1320 into the memory 1304 and may provide an interface between other application software executing on the device 1300 and hardware resources of the device 1300. More specifically, the O/S 1322 may include a set of computer-executable instructions for managing hardware resources of the device 1300 and for providing common services to other application programs (e.g., managing memory allocation among various application programs). In certain example embodiments, the O/S 1322 may control execution of the other program module(s) to dynamically enhance characters for content rendering. The O/S 1322 may include any operating system now known or which may be developed in the future including, but not limited to, any server operating system, any mainframe operating system, or any other proprietary or non-proprietary operating system.

The DBMS 1324 may be loaded into the memory 1304 and may support functionality for accessing, retrieving, storing, and/or manipulating data stored in the memory 1304 and/or data stored in the data storage 1320. The DBMS 1324 may use any of a variety of database models (e.g., relational model, object model, etc.) and may support any of a variety of query languages. The DBMS 1324 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 1300 is a mobile device, the DBMS 1324 may be any suitable light-weight DBMS optimized for performance on a mobile device.

Referring now to other illustrative components of the device 1300, the input/output (I/O) interface(s) 1306 may facilitate the receipt of input information by the device 1300 from one or more I/O devices as well as the output of information from the device 1300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 1300 or may be separate. The I/O devices may further include, for example, any number of peripheral devices such as data storage devices, printing devices, and so forth.

The I/O interface(s) 1306 may also include an interface for an external peripheral device connection such as universal serial bus (USB), FireWire, Thunderbolt, Ethernet port or other connection protocol that may connect to one or more networks. The I/O interface(s) 1306 may also include a connection to one or more of the antenna(s) 1334 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The device 1300 may further include one or more network interface(s) 1308 via which the device 1300 may communicate with any of a variety of other systems, platforms, networks, devices, and so forth. The network interface(s) 1308 may enable communication, for example, with one or more wireless routers, one or more host servers, one or more web servers, and the like via one or more of networks.

The antenna(s) 1334 may include any suitable type of antenna depending, for example, on the communications protocols used to transmit or receive signals via the antenna(s) 1334. Non-limiting examples of suitable antennas may include directional antennas, non-directional antennas, dipole antennas, folded dipole antennas, patch antennas, multiple-input multiple-output (MIMO) antennas, or the like. The antenna(s) 1334 may be communicatively coupled to one or more transceivers 1312 or radio components to which or from which signals may be transmitted or received.

As previously described, the antenna(s) 1334 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1334 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1334 may be configured to transmit or receive radio frequency signals within any suitable frequency range forming part of the unlicensed portion of the radio spectrum.

The antenna(s) 1334 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1312 may include any suitable radio component(s) for—in cooperation with the antenna(s) 1334—transmitting or receiving radio frequency (RF) signals in the bandwidth and/or channels corresponding to the communications protocols utilized by the device 1300 to communicate with other devices. The transceiver(s) 1312 may include hardware, software, and/or firmware for modulating, transmitting, or receiving—potentially in cooperation with any of antenna(s) 1334—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1312 may further include hardware, firmware, or software for receiving GNSS signals. The transceiver(s) 1312 may include any known receiver and baseband suitable for communicating via the communications protocols utilized by the device 1300. The transceiver(s) 1312 may further include a low noise amplifier (LNA), additional signal amplifiers, an analog-to-digital (A/D) converter, one or more buffers, a digital baseband, or the like.

The sensor(s)/sensor interface(s) 1310 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1314 may be any device configured to generate audible sound. The optional microphone(s) 1316 may be any device configured to receive analog sound input or voice data.

It should be appreciated that the program module(s), applications, computer-executable instructions, code, or the like depicted in FIG. 13 as being stored in the data storage 1320 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the device 1300, and/or hosted on other computing device(s) accessible via one or more networks, may be provided to support functionality provided by the program module(s), applications, or computer-executable code depicted in FIG. 13 and/or additional or alternate functionality. Further, functionality may be modularized differently such that processing described as being supported collectively by the collection of program module(s) depicted in FIG. 13 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 13 may be implemented, at least partially, in hardware and/or firmware across any number of devices.

It should further be appreciated that the device 1300 may include alternate and/or additional hardware, software, or firmware components beyond those described or depicted without departing from the scope of the disclosure. More particularly, it should be appreciated that software, firmware, or hardware components depicted as forming part of the device 1300 are merely illustrative and that some components may not be present or additional components may be provided in various embodiments. While various illustrative program module(s) have been depicted and described as software module(s) stored in data storage 1320, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An autonomous tennis ball retrieval robot comprising:
a housing comprising a ball inlet;
a first wheel coupled to the housing;
a ball collection portion coupled to the housing and configured to receive a plurality of balls;
a first arm removably coupled to the housing;
a second arm removably coupled to the housing, wherein the first arm and the second arm together guide balls towards the ball inlet;
a ball direction device configured to direct balls from the ball inlet to the ball collection portion; and
a first sensor coupled to the first arm, wherein the autonomous tennis ball retrieval robot is configured to detect obstacles using the first sensor;
wherein the autonomous tennis ball retrieval robot is configured to retrieve balls disposed in an ambient environment, and is configured to be transported in a rolling mode using the first wheel when the first arm and the second arm are removed from the housing.

2. The autonomous tennis ball retrieval robot of claim 1, further comprising:
a bag removably coupled to the ball collection portion.

3. The autonomous tennis ball retrieval robot of claim 1, further comprising:
a second sensor coupled to the housing;
wherein the autonomous tennis ball retrieval robot is configured to navigate autonomously using the second sensor.

4. The autonomous tennis ball retrieval robot of claim 1, wherein the first arm further comprises:
an angled head;

a second wheel disposed in the angled head; and
a high friction material disposed about the angled head;
wherein the first sensor is disposed in the angled head.

5. The autonomous tennis ball retrieval robot of claim 4, wherein the angled head comprises a triangular configuration.

6. The autonomous tennis ball retrieval robot of claim 1, wherein an angle between the first arm and the second arm is adjustable.

7. The autonomous tennis ball retrieval robot of claim 1, wherein the ball direction device comprises:
a roller configured to engage outer surfaces of balls.

8. The autonomous tennis ball retrieval robot of claim 7, further comprising:
a memory that stores computer-executable instructions; and
at least one processor configured to access the memory and execute the computer-executable instructions to:
cause the roller to move in a first direction;
detect a ball jam in the ball direction device;
cause the roller to move in a second direction;
determine that the ball jam is cleared; and
cause the roller to move in the first direction.

9. The autonomous tennis ball retrieval robot of claim 8, wherein the at least one processor is further configured to execute the computer-executable instructions to:
cause the autonomous tennis ball retrieval robot to reverse; and
cause the autonomous tennis ball retrieval robot to move forward after the ball jam is cleared.

10. The autonomous tennis ball retrieval robot of claim 1, further comprising:
a motor disposed in the housing and configured to rotate the first wheel; and
a second wheel coupled to the ball collection portion, wherein the second wheel is a passive wheel.

11. The autonomous tennis ball retrieval robot of claim 1, wherein the autonomous tennis ball retrieval robot is configured to retrieve tennis balls autonomously.

12. The autonomous tennis ball retrieval robot of claim 1, wherein the autonomous tennis ball retrieval robot is further configured to eject tennis balls autonomously.

13. The autonomous tennis ball retrieval robot of claim 1, further comprising:
a battery disposed in the housing; and
a detachable power cord configured to couple the first sensor to the battery.

14. A device comprising:
a housing;
a first wheel coupled to the housing;
a ball collection portion configured to receive a plurality of balls;
a net removably coupled to the ball collection portion;
a first arm removably coupled to the housing;
a second arm removably coupled to the housing, wherein the first arm and the second arm together guide balls towards a ball inlet disposed on the housing;
a ball direction device configured to direct balls from the ball inlet to the ball collection portion; and
a first sensor, wherein the device is configured to detect obstacles using the first sensor;
wherein the device is configured to retrieve balls and is configured to be transported in a rolling mode using the first wheel.

15. The device of claim 14, further comprising:
a second sensor coupled to the housing;
wherein the device is configured to navigate autonomously using the first sensor and the second sensor.

16. The device of claim 14, wherein the first arm further comprises:
an angled head;
a second wheel disposed in the angled head; and
a high friction material disposed about the angled head;
wherein the first sensor is disposed in the angled head.

17. The device of claim 14, further comprising:
a motor configured to rotate the first wheel; and
a second wheel coupled to the ball collection portion, wherein the second wheel is a passive wheel.

18. The device of claim 14, wherein the ball direction device comprises:
a wheel comprising a high friction surface, the wheel configured to engage outer surfaces of balls.

19. The device of claim 14, further comprising:
a controller configured to:
cause the roller to move in a first direction;
detect a ball jam in the ball direction device;
cause the roller to move in a second direction;
determine that the ball jam is cleared; and
cause the roller to move in the first direction.

20. A tennis ball collection device comprising:
a housing comprising a ball inlet;
a first wheel coupled to the housing;
a ball collection portion coupled to the housing and configured to receive a plurality of balls;
a first arm removably coupled to the housing;
a second arm removably coupled to the housing, wherein the first arm and the second arm together guide balls towards the ball inlet;
a ball direction device configured to direct balls from the ball inlet to the ball collection portion;
a first sensor coupled to the first arm, wherein the autonomous tennis ball retrieval robot is configured to detect obstacles using the first sensor; and
a controller configured to:
cause the roller to move in a first direction;
detect a ball jam in the ball direction device;
cause the roller to move in a second direction;
determine that the ball jam is cleared; and
cause the roller to move in the first direction;
wherein the tennis ball collection device is configured to retrieve balls disposed in an ambient environment, and is configured to be transported in a rolling mode using the first wheel when the first arm and the second arm are removed from the housing.

* * * * *